US010913059B2

(12) United States Patent
Schiraga

(10) Patent No.: US 10,913,059 B2
(45) Date of Patent: Feb. 9, 2021

(54) PIPETTE CALIBRATION AND VOLUME OFFSET MECHANISM

(71) Applicant: Mettler-Toledo Rainin, LLC, Oakland, CA (US)

(72) Inventor: Seton Schiraga, Alameda, CA (US)

(73) Assignee: Mettler-Toledo Rainin, LLC, Oakland, CA (US)

( * ) Notice: Subject to any disclaimer, the term of this patent is extended or adjusted under 35 U.S.C. 154(b) by 525 days.

(21) Appl. No.: 15/865,827

(22) Filed: Jan. 9, 2018

(65) Prior Publication Data

US 2019/0083971 A1 Mar. 21, 2019

Related U.S. Application Data

(63) Continuation of application No. 15/708,551, filed on Sep. 19, 2017, now Pat. No. 10,744,498, and a continuation of application No. 15/708,385, filed on Sep. 19, 2017, now Pat. No. 10,751,712.

(51) Int. Cl.
*B01L 3/02* (2006.01)
*F16H 3/54* (2006.01)
*F16H 63/16* (2006.01)
*F16H 37/04* (2006.01)

(52) U.S. Cl.
CPC ......... *B01L 3/0224* (2013.01); *B01L 3/0227* (2013.01); *F16H 3/54* (2013.01); *F16H 37/04* (2013.01); *F16H 63/16* (2013.01); *B01L 2200/0605* (2013.01); *B01L 2300/026* (2013.01); *F16H 2200/0034* (2013.01); *F16H 2200/2005* (2013.01)

(58) Field of Classification Search
None
See application file for complete search history.

(56) References Cited

U.S. PATENT DOCUMENTS

| 3,827,305 | A | | 8/1974 | Gilson et al. | |
|---|---|---|---|---|---|
| 4,096,750 | A | * | 6/1978 | Sturm | B01L 3/0224 422/925 |
| 4,250,755 | A | * | 2/1981 | Kenney | B01L 3/0224 422/925 |
| 4,395,921 | A | * | 8/1983 | Oppenlander | B01L 3/0224 222/309 |

(Continued)

FOREIGN PATENT DOCUMENTS

| EP | 2329885 A1 | 6/2011 |
|---|---|---|
| EP | 2633915 A2 | 9/2013 |
| WO | 98/20973 A2 | 5/1998 |

*Primary Examiner* — Brian R Gordon
(74) *Attorney, Agent, or Firm* — Standley Law Group LLP; Jeffrey S. Standley; Eric M. Gayan

(57) ABSTRACT

A pipette calibration and volume offset mechanism. The calibration and volume offset mechanism is provided to facilitate user selectable calibration or volume offset operations of a pipette to which the calibration and volume offset mechanism is installed, through axial displacement of a threaded element that effectively moves the home position of the pipette. An offset counter of the calibration and volume offset mechanism is rotationally coupled to the threaded element during a volume offset operation to indicate offset magnitude, but decoupled from threaded element during a calibration or recalibration operation.

13 Claims, 17 Drawing Sheets

(56) References Cited

U.S. PATENT DOCUMENTS

| | | | | |
|---|---|---|---|---|
| 4,501,163 | A * | 2/1985 | MacDermott | B01L 3/0224 422/925 |
| 4,567,780 | A * | 2/1986 | Oppenlander | B01L 3/0224 422/525 |
| 4,672,857 | A | 6/1987 | MacDermott | |
| 4,711,124 | A | 12/1987 | Cagle | |
| 5,018,394 | A * | 5/1991 | Gilson | B01L 3/0224 422/925 |
| 5,320,810 | A * | 6/1994 | Al-Mahareeq | B01L 3/0224 422/517 |
| 5,413,006 | A * | 5/1995 | D'Autry | B01L 3/0224 422/925 |
| 5,650,124 | A * | 7/1997 | Gilson | B01L 3/0224 422/180 |
| 5,896,804 | A * | 4/1999 | Kimura | B01L 3/0227 92/136 |
| 6,295,880 | B1 * | 10/2001 | Gilson | B01L 3/0224 73/864.18 |
| 6,428,750 | B1 | 8/2002 | Rainin et al. | |
| 6,455,006 | B1 * | 9/2002 | Mukai | B01L 3/0224 422/501 |
| 6,959,616 | B2 * | 11/2005 | Viot | B01L 3/0224 73/864.18 |
| 7,105,130 | B2 | 9/2006 | Telimaa et al. | |
| 7,175,813 | B2 | 2/2007 | Petrek et al. | |
| 8,133,453 | B2 * | 3/2012 | Molitor | B01L 3/0224 422/501 |
| 8,397,593 | B2 | 3/2013 | Petrek et al. | |
| 9,630,174 | B2 * | 4/2017 | Sarna | B01L 3/0224 |
| 9,901,919 | B2 * | 2/2018 | Heinonen | B01L 3/0224 |
| 9,931,627 | B2 * | 4/2018 | Sanchez | B01L 3/0224 |
| 9,931,628 | B2 * | 4/2018 | LaCroix | B01L 3/0224 |
| 10,494,057 | B1 | 12/2019 | Zhou | |
| 10,758,899 | B2 * | 9/2020 | Reichmuth | B01L 3/0227 |
| 2002/0020233 | A1 * | 2/2002 | Baba | B01L 3/0286 73/864.16 |
| 2003/0099578 | A1 * | 5/2003 | Cote | G10L 15/26 422/525 |
| 2005/0142038 | A1 | 6/2005 | Petrek et al. | |
| 2005/0155439 | A1 * | 7/2005 | Belgardt | B01L 3/0279 73/864.01 |
| 2005/0262951 | A1 * | 12/2005 | Cote | B01L 3/0224 73/864 |
| 2006/0096349 | A1 * | 5/2006 | Czernecki | B01L 3/0224 73/1.74 |
| 2006/0211533 | A1 | 9/2006 | Yoo | |
| 2008/0223108 | A1 * | 9/2008 | Kobayashi | G01F 11/027 73/1.74 |
| 2009/0274587 | A1 * | 11/2009 | Butz | B01L 3/0217 422/400 |
| 2010/0083775 | A1 * | 4/2010 | Wilmer | B01L 3/0224 73/864.18 |
| 2011/0036185 | A1 | 2/2011 | Petrek et al. | |
| 2011/0132110 | A1 * | 6/2011 | Kimura | B01L 3/0224 73/864.01 |
| 2012/0148459 | A1 | 6/2012 | Sama et al. | |
| 2013/0233095 | A1 * | 9/2013 | Wilmer | B01L 3/0224 73/864.01 |
| 2014/0332565 | A1 * | 11/2014 | Chiba | B01L 3/0227 222/333 |
| 2015/0030513 | A1 * | 1/2015 | Butz | B01L 3/0227 422/511 |
| 2016/0228868 | A1 | 8/2016 | Sanchez | |
| 2016/0377156 | A1 | 12/2016 | Robles | |
| 2017/0037961 | A1 | 2/2017 | Pritchard et al. | |
| 2017/0128932 | A1 * | 5/2017 | Ito | G01N 35/1081 |
| 2017/0166865 | A1 * | 6/2017 | Peng | A61B 17/435 |
| 2019/0193282 | A1 * | 6/2019 | Iwasaki | B01L 3/0227 |

* cited by examiner

PIPETTE CALIBRATION AND VOLUME OFFSET MECHANISM

CROSS-REFERENCE TO RELATED APPLICATIONS

This application is a continuation of U.S. application Ser. No. 15/708,385, filed Sep. 19, 2017, and is also a continuation of U.S. application Ser. No. 15/708,551, filed Sep. 19, 2017. Both of said prior applications are incorporated by reference in their entirety as if fully set forth herein.

TECHNICAL FIELD

Exemplary embodiments described herein are directed generally to a calibration and volume offset adjustment mechanism for a volume adjustable pipette.

BACKGROUND

As would be understood by one of skill in the art, a pipette is a device that is normally used in conjunction with a pipette tip to transfer or distribute a measured volume of liquid from one location to another. Manually-operated air-displacement pipettes, which are of the most interest with respect to this application, operate generally by creating a vacuum via the retraction of a piston located in the pipette body. Thus, when the open end of an associated pipette tip is submersed in a liquid, the resulting vacuum draws air from the pipette tip and an amount of the liquid is consequently drawn into the tip to replace the evacuated air. Movement of the pipette piston is regulated such that a desired measured amount of liquid is drawn into the tip during the aspiration phase of the pipetting operation.

Manually-operated air-displacement pipettes are available in a wide volume range of between about 0.2 µL to several thousand µL. Because a user may need to pipette a multitude of different liquid volumes, such pipettes are frequently offered with different volume ranges (e.g., 0.5-10 µL, 10-115 µL, 115-1,000 µL) and with volume adjustability within the selected volume range. Volume adjustability is commonly accomplished, for example, by manually rotating a provided volume setting shaft or manually rotating the plunger button and associated plunger of the pipette which, through one of various possible associated mechanisms, results in a change in the volume setting of the pipette.

A common drawback to known volume-adjustable pipettes has been the time and effort required to make volume adjustments—particularly when the difference between the current volume setting and a desired volume setting is large. For example, in the case of known volume-adjustable pipettes, a full rotation of the pipette volume adjusting device may result in a volume change of only 5%-10% of the total volume of the pipette. Thus, making a large change in volume may require significant and time consuming effort on the part of a user.

Volume adjustable pipettes with speed-increased volume adjustment functionality are known. However, these know pipettes suffer from various deficiencies including, but not limited to, complex and/or inaccurate volume adjustment mechanisms, the need to employ separate volume adjustment inputs for low speed and high speed volume adjustment; and/or the need to provide a volume adjustment input that is separate from the pipette plunger rod or plunger button.

As would also be understood by one of skill in the art, calibration of the dispensed fluid volume is required for accurate pipetting. Consequently, pipettes are typically calibrated at the factory and may also be calibrated during servicing operations.

In one known pipette design, calibration is accomplished by disconnecting a volume display from an associated volume screw, and volume offset is separately accomplished by moving a bottom stop. In another known pipette design, calibration is accomplished by disengaging a volume display from an associated volume screw using a spline-type coupling located within the counter wheels of the volume display, and subsequently adjusting the position of the volume screw. In yet another known pipette design, calibration and volume offset are accomplished by moving an upper stop of the pipette without changing the pipette volume display.

It is evident from the foregoing description that adjustable volume pipettes and pipettes that permit user calibration or volume offset are known. However, when the identified drawbacks of known volume-adjustable pipettes are considered in the context of the numerous pipetting operations and associated volume adjustments made by many pipette users over the course of a typical work day, the benefits of providing an improved design that facilitates more efficient pipette volume adjustment should be readily apparent. Similarly, while mechanisms and techniques for pipette calibration and volume offset are known, it would nonetheless be desirable to provide a simplified and compact pipette calibration/volume offset mechanism that may be used in conjunction with an improved pipette volume adjustment mechanism in a new manually operated pipette.

SUMMARY

Exemplary embodiments described herein are directed to a quickset mechanism for easily and rapidly adjusting the liquid volume of a manually-operated (manual) volume-adjustable pipette. Other exemplary embodiments described herein are directed to a combined pipette calibration and volume offset mechanism that may be used in a manual pipette, such as but not limited to a volume-adjustable manual pipette having quickset volume adjustability. Still other exemplary embodiments described herein are directed to a volume-adjustable manual pipette that employs a quickset mechanism for rapid volume adjustment, and to such a quickset pipette with a combined pipette calibration and volume offset mechanism.

An exemplary pipette quickset volume adjustment mechanism (quickset mechanism) allows a user to rapidly and accurately adjust the volume of a pipette. Generally speaking, volume adjustments are made by adjusting the position of a volume screw of the pipette through rotation of the pipette plunger button—which rotates the plunger rod to which the plunger button is affixed. The quickset mechanism includes a specialized planetary gearbox that is selectively rotationally coupled to the plunger rod and adapted to alter the rotation speed-ratio between the plunger rod and the volume screw.

In one exemplary embodiment, the quickset mechanism may provide a user with three input modes: a direct drive mode, a speed multiplying mode, and a lock mode that prohibits volume adjustment. In the direct drive mode, the volume screw of the pipette is directly driven (i.e., in a 1:1 ratio) by rotation of the plunger button. In the speed multiplying mode, rotation of the plunger button drives the planetary gearbox which, in turn, rotates the volume screw. The planetary gearbox may have a wide range of possible speed ratios (e.g., 4:1). Consequently, a single rotation of the plunger button will result in multiple (e.g., four) rotations of the volume screw when the quickset mechanism is set to the speed multiplying mode. This allows a user to make large volume changes quickly and accurately. After using the speed multiplying mode, the quickset mechanism may be set to the direct drive mode to make the final, fine volume adjustment. The lock mode may be used to prevent inadvertent volume changes or drift once a desired pipette volume is set.

One exemplary embodiment of a volume-adjustable manual pipette with quickset volume adjustment (quickset pipette) is similar to a traditional manual pipette in that the quickset pipette may include a body portion, a tip mounting shaft attached to the body portion at the distal end thereof, and a piston assembly including a piston, a stroke spring, and a plunger button attached to a plunger rod, which is coupled to the piston. A user may axially displace the piston by way of the plunger button and associated plunger rod to aspirate and dispense a liquid of interest. The quickset pipette further includes a quickset mechanism, such as the exemplary quickset mechanism described above. Thus, an exemplary quickset pipette affords a user with the ability to aspirate and dispense liquids of different volumes, while easily and rapidly making precise volume changes.

An exemplary quickset pipette may also include a combined calibration and volume offset mechanism by which the pipette may be calibrated and/or a volume offset may be applied. Generally speaking, this exemplary calibration/offset mechanism includes among other components a mode selection mechanism, a follower element, an offset counter, a user rotatable input mechanism, a (calibration) housing, and a coupling for coupling the offset counter to a threaded element that is axially displaceable to adjust the home position of a pipette to which the calibration/offset mechanism is installed, thereby increasing or decreasing the aspiratable liquid volume of the pipette.

An exemplary calibration/offset mechanism may be installed in a volume-adjustable manual pipette, such as but not limited to an exemplary quickset pipette. In any case, the pipette may again have traditional manual pipette components such as those mentioned above. When the pipette is a quickset pipette the calibration/offset mechanism is installed in the pipette body along with the quickset mechanism.

A calibration adjustment is effected by first rotating the user rotatable input mechanism of the calibration/offset mechanism so that the offset counter displays a "zero" offset. Next, the mode selection mechanism is placed in the calibration mode, which disengages the offset counter from the coupling. The pipette may then be calibrated by turning the user rotatable input mechanism, which adjusts the axial location of the home position (and volume) of the pipette by axially displacing the threaded element. The volume may be adjusted in this manner, for example, until the gravimetric reading of the aspirated liquid dispensed by the pipette matches the set point of the pipette that is displayed by the counter wheels of the volume display.

To effect a volume offset, a user first ensures that the mode selection mechanism is in the offset mode—which is the default mode in this exemplary embodiment. This engages the offset counter, which is nominally set to zero. The desired volume offset may then be entered by turning the user rotatable input mechanism, which again adjusts the axial location of the home position and volume of the pipette by axially displacing the threaded element. In the offset mode, the amount of offset entered is tracked and indicated by the offset counter.

Other aspects and features of the general inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENTS

As used herein "constrained" is intended to mean that the macro motion of a given component in a defined direction is permitted, but is limited in some fashion.

As used herein "restrained" is intended to mean that the macro motion of a given component in a defined direction is not permitted.

As used herein "macro motion" is intended to mean motion beyond what is allowed by slip-fit type clearances. For example, a rotating shaft is considered to have no macro motion in the direction perpendicular to its axis of rotation even if a clearance is provided to allow free rotation.

Figure 1:
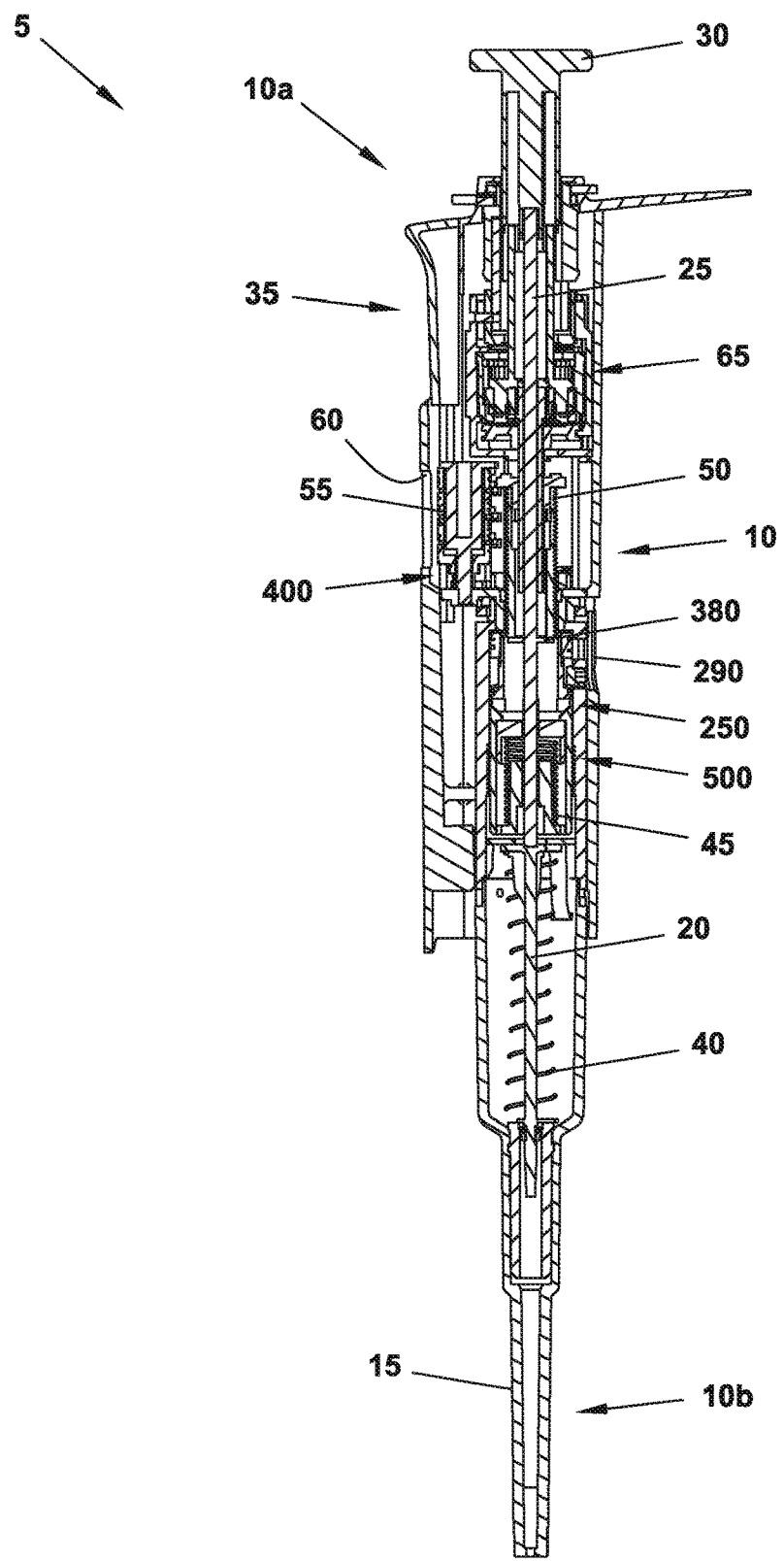
FIG. 1 is a cross-sectional view of an exemplary volume-adjustable manual pipette incorporating an exemplary quickset volume adjustment mechanism and an exemplary calibration/offset mechanism.
Figure 8A:
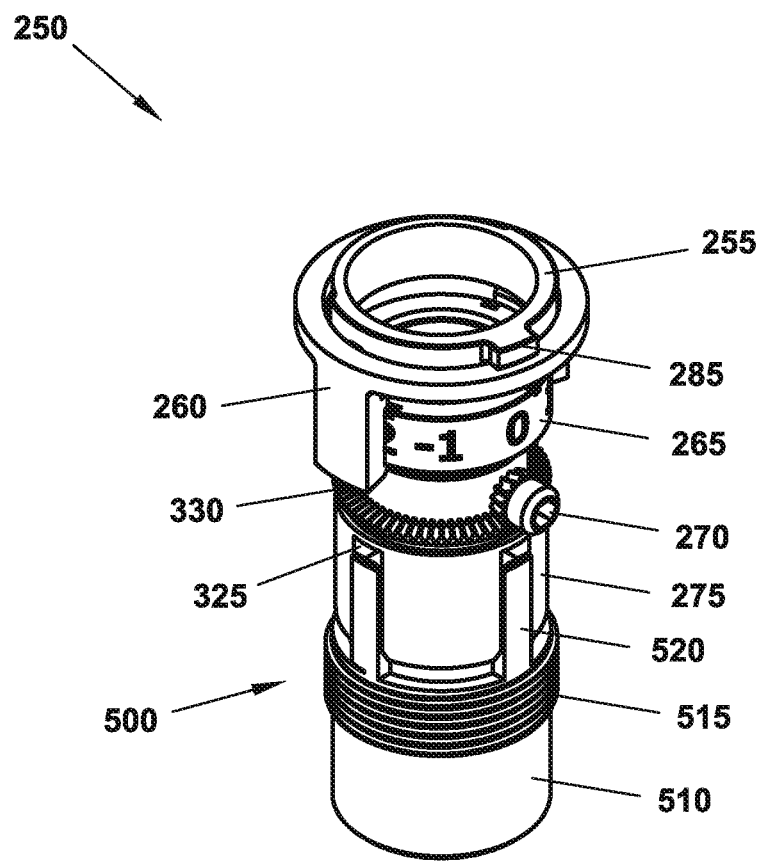
FIGS. 8A-8B are enlarged perspective views of the exemplary calibration/offset mechanism of FIGS. 7A-7B in various states of assembly.

One exemplary manually-operated, quickset volume-adjustable pipette (quickset pipette) 5 is depicted in cross section in FIG. 1. The quickset pipette 5 generally includes a body 10 for gripping by a user. The pipette body 10 includes a tip mounting portion 15 at a distal end 10*b* thereof. The tip mounting portion 15 is adapted to receive and retain a pipette tip (not shown). A plunger assembly of the quickset pipette 5 comprises a piston 20 that is located for reciprocating movement within the body portion 10, a plunger rod 25 that extends proximally upward from the piston, and a plunger button 30 that is located outside the body portion 10 and is affixed to a proximal end of the plunger rod for manipulation by user. A stroke spring 40 resides within the body portion 10 to drive the piston 25 proximally during a liquid aspiration phase of a pipetting operation. A blowout spring 45 of a blowout assembly 500 (see FIGS. 8A-8B) also resides within the body portion 10 and, as would be understood by one of skill in the art, acts to return the piston 25 from a blowout operation that may be performed subsequent to dispensing aspirated liquid from the pipette. A tip ejector 35 may also be provided to eject pipette tips from the tip mounting shaft 15 when desired.

Because the quickset pipette 5 is a volume-adjustable pipette, a volume adjustment assembly is also provided for effectuating desired volume changes. The volume adjustment assembly includes, among other components, the plunger rod 25, the plunger button 30, and a substantially hollow volume screw 50 through which the plunger rod passes. The bottom face of the volume screw 50 defines the upper stop position of the plunger assembly in this exemplary embodiment, such as by contact with a flange 380 on the plunger rod 25.

A volume setting display assembly 400 providing a volume setting display 55 that is visible through an opening 60 in the body 10 of the quickset pipette 5 may also be included for indicating the current pipette volume setting. As will be described in far greater detail below, the volume adjustment assembly of the quickset pipette 5 further includes a quickset volume adjustment mechanism (quickset mechanism) 65 that facilitates a rapid adjustment of the pipette volume when desired.

As will also be described in further detail below, this exemplary quickset pipette 5 additionally includes a calibration/offset mechanism 250. The calibration/offset mechanism 250 permits a user, service technician, etc., to factory calibrate or recalibrate the pipette, and/or to set a volume offset.

Setting aside for a moment the unique functionality imparted to the quickset pipette 5 by the quickset mechanism 65 and the calibration/offset mechanism 250, the quickset pipette otherwise operates generally as would be familiar to one of skill in the art. That is, during a liquid aspiration phase of pipette operation, a user depresses the plunger button 30 to axially move the piston 20, against the biasing force of the stroke spring 40, from the upper stop position to a lower stop (home) position. The open end of the pipette tip (not shown) is then placed into a liquid of interest, and the plunger button 30 is released, allowing the stroke spring 40 to return the piston 20 to the upper stop position while simultaneously aspirating a volume of the liquid of interest. To dispense the aspirated liquid, the user places the pipette tip over a desired receptacle, and once again depresses the plunger button 30 to move the piston 20 from the upper stop position to the home position. Once the aspirated liquid is dispensed, the user may also perform a blowout operation by further depressing the plunger button 30 so as to cause an additional axial movement of the piston 20 and a compression of the blowout spring 45. Upon completion of a blowout operation, releasing the plunger button 30 will once again result in a return of the piston 20 to the upper stop position, this time by the combined biasing forces of the blowout spring 45 and the stroke spring 40.

Figure 2:
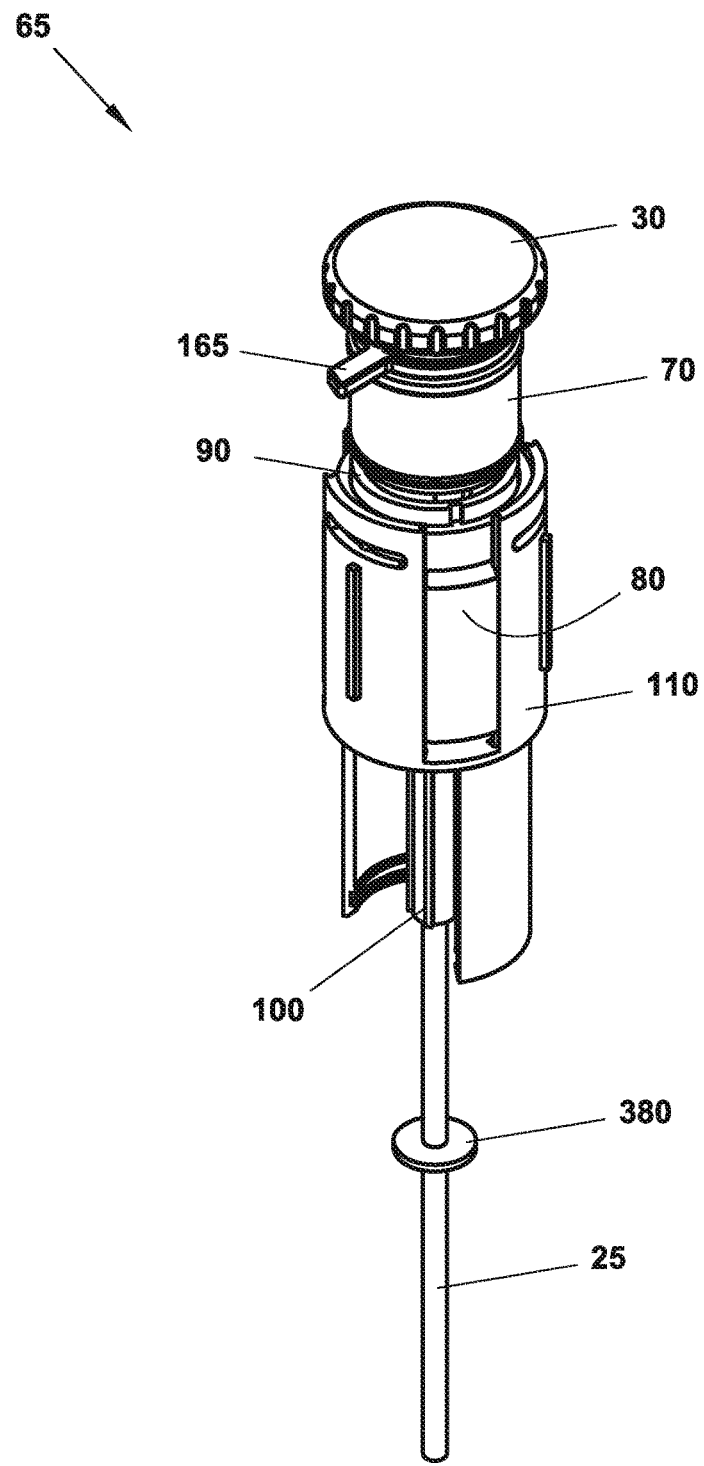
FIG. 2 is an enlarged perspective view of an exemplary quickset volume adjustment mechanism.
Figure 3:
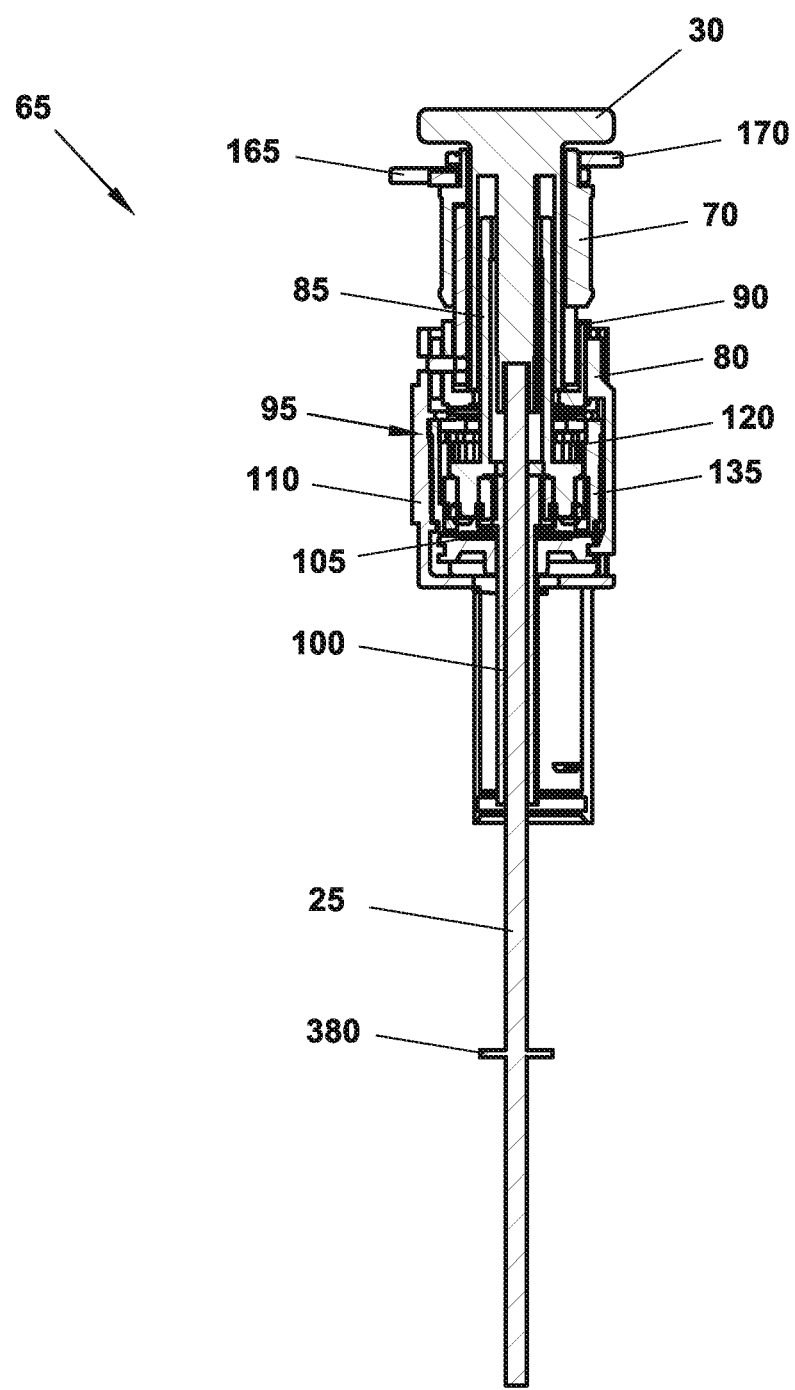
FIG. 3 is a cross-sectional view of the exemplary quickset volume adjustment mechanism of FIG. 2.

Because volume changes between consecutive aspiration/dispensing operations may be significant, as explained above, the volume adjustment assembly includes the exemplary quickset mechanism 65, which permits a selective multiplication in the speed by which the pipette volume may be adjusted. A more detailed depiction of the exemplary quickset mechanism 65 appears in FIGS. 2-4B. As best shown in FIGS. 3-4B, the exemplary quickset mechanism 65 includes a transmission input 70, one or more cam follower pins 75 that are mounted to a distal portion of the transmission input, a first (direct drive) barrel cam 80, a gearbox input 85, a second (speed multiplying) barrel cam 90, a planetary gearbox 95, a gearbox output shaft 100, and a direct drive lock plate 105. The first barrel cam 80 and a majority of the remaining quickset mechanism components are retained in a frame 110 when the quickset mechanism 65 is in an assembled state, as shown in FIG. 2. The plunger rod 25 passes axially through the entirety of the quickset mechanism 65.

The transmission input 70 of the quickset mechanism 65 acts as a mode selector through which a user can opt to adjust the pipette volume using a fine (direct drive) or coarse (speed multiplying) mode. In some embodiments, the transmission input 70 may also be used to lock the quickset mechanism, thereby prohibiting user volume adjustments and preventing inadvertent changes or drift in selected pipette volume. The transmission input 70 is located at the proximal end 10*a* of the pipette body 10, and will typically include a lever 165 or another appropriate actuator that protrudes through an opening in the pipette body to facilitate user rotation of the transmission input. In this exemplary quickset pipette 5, the transmission input 70 also includes detented mode positions that correspond to each of the selectable direct drive, speed-multiplied and locked quickset mechanism modes. The transmission input 70 may also include one or more indicating elements 170 that may correspondingly point to a mode number, symbol or other graphic mode identifier located on the pipette body 10. The indicating element(s) 170 will indicate the volume adjustment mode selected by a user via rotation of the transmission input 70.

The direct drive barrel cam 80 and the speed multiplying barrel cam 90 each include one or more arcuate or sloped cam slots 80*a*, 90*a*, while the frame 110 includes one or more linear retention slots 110*a*. The cam slots 80*a*, 90*a* and the retention slots 110*a* substantially correspond in location to the one another when the quickset mechanism 65 is assembled, however, the cam slots 80*a*, 90*a* may be of somewhat different shape or orientation to produce a desired individual movement of the direct drive barrel cam 80 and the speed multiplying barrel cam 90. The one or more cam follower pins 75 likewise extend through or into the one or more cam slots 80*a*, 90*a* and the one or more retention slots 110*a* in the assembled direct drive barrel cam 80, speed multiplying barrel cam 90, and frame 110 respectively. Thus, the direct drive barrel cam 80 is rotationally restrained by the frame 110, and is axially constrained by the movement of the one or more cam follower pins 75 of the transmission input 70 that reside in the cam slots 80*a* of the direct drive barrel cam. During rotation of the transmission mechanism lever 165, the one or more cam follower pins 75 rotate in the slots 110*a* in the frame, which causes the direct drive barrel cam 80 and the speed multiplying barrel cam 90 to move upward or downward due to corresponding interaction of the cam slots 80*a*, 90*a* located therein with the one or more cam follower pins 75.

In this exemplary embodiment, three cam follower pins 75, three corresponding cam slots 80a, 90a, and three corresponding retention slots 110a are used for force balancing purposes. Other numbers of cam follower pins, cam slots and retention slots may be used in other embodiments.

Figure 4A:
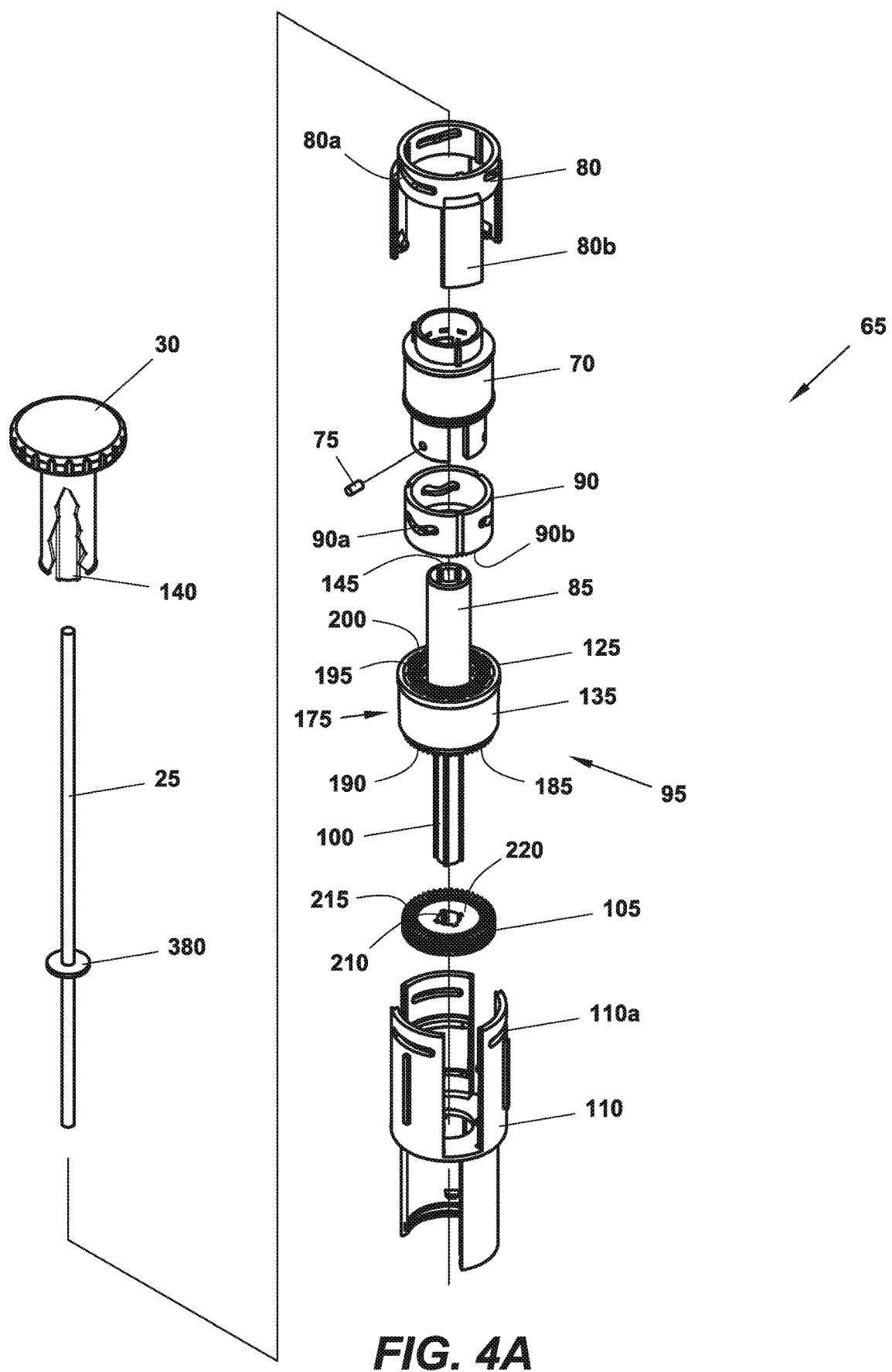
FIG. 4A is an enlarged and exploded view of the exemplary quickset volume adjustment mechanism shown in FIG. 2.
Figure 4B:
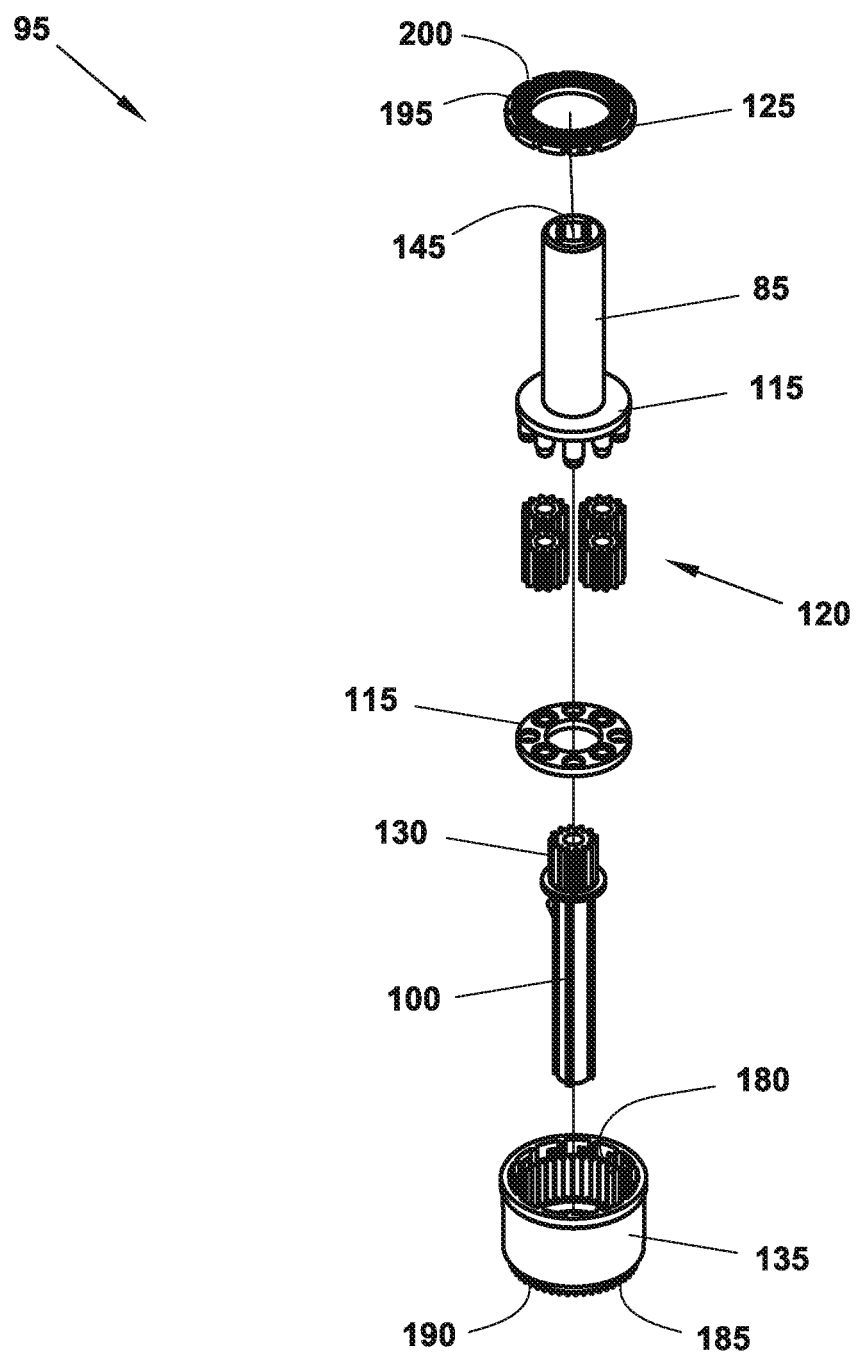
FIG. 4B is an enlarged and further exploded view of a planetary gearbox shown in FIG. 4A.

The planetary gearbox 95 shown in partially exploded form in FIG. 4A, is shown further exploded in FIG. 4B. This exemplary planetary gearbox 95 is comprised of planet gear carrier 115, a plurality of planet gears 120, a cap 125 (only as part of the gearbox housing), a sun gear 130, a ring gear 135, and the gearbox output shaft 100. As shown, the planet gear carrier 115 may be an integral part of the gearbox input 85, or the planet gear carrier may otherwise be affixed to a distal end thereof. Similarly, the sun gear 130 may be an integral part of or may otherwise be affixed to a proximal end of the gearbox output shaft 100. The various components of the planetary gearbox 95 are contained in a gearbox housing. In this exemplary embodiment, the housing is comprised of the ring gear 135 and the cap 125, which are adapted to snap together or to be otherwise joined so as to form a substantially monolithic structure.

In this exemplary embodiment, the planetary gearbox 95 is a single-stage planetary gearbox. Consequently, and generally speaking, when the planetary gearbox 95 is selectively engaged, the speed by which the volume of the quickset pipette 5 may be adjusted is multiplied by the speed ratio provided by the planetary gearbox 95. A wide range of planetary gearbox speed ratios may be selected in different exemplary embodiments. For purposes of illustration only, the speed ratio provided by the planetary gearbox 95 of this exemplary quickset pipette 5 is 4:1.

The plunger button 30 and plunger rod 25 of the quickset pipette 5 also play a role in the operation of the quickset mechanism 65. More particularly, the plunger rod 25 passes through but is rotationally coupled to the gearbox input 85 of the planetary gearbox 95 of the quickset mechanism 65, and the plunger button 30 is affixed to the proximal end of the plunger rod such that rotation of the plunger button will also rotate the plunger rod. In this exemplary embodiment, rotational affixation of the plunger rod 25 to the gearbox input 85 is accomplished by way of a hex-shaped (or other non-circular shaped) protrusion 140 on the plunger rod and a correspondingly shaped recess 145 in the proximal end of the gearbox input that is dimensioned to securely receive and retain the hex-shaped protrusion. Other rotational coupling techniques may be employed in other embodiments. Consequently, a rotation of the plunger button 30 will produce a rotation of the plunger rod 25, and rotation of the plunger rod will produce a rotation of the gearbox input 85.

As briefly suggested above, when the exemplary quickset mechanism 65 is assembled, the speed multiplying barrel cam 90 is concentrically located within the direct drive barrel cam 80 such that the distal portion of the transmission input 70 is received therein, and the one or more cam follower pins 75 that protrude from the transmission input 70 simultaneously extend through the one or more cam slots 80a in the direct drive barrel cam 80, the one or more cam slots 90a in the speed multiplying barrel cam 90, and the one or more cam slots 110a in the frame 110. The axial motion of the one or more cam follower pins 75 is restrained by slots 110a in the frame 110, while the rotational motion of the one or more cam follower pins is constrained by the slots in the frame. The transmission input 70 is axially restrained and is rotationally constrained by engagement of the one or more cam follower pins 75 with the slots 110a in the frame 110. Consequently, rotation of the transmission input 70 within permitted limits via the lever 165 will cause the one or more cam follower pins 75 to move within the arcuate or sloped cam slots 80a, 90a, 110a which produces an axial displacement of the barrel cams 80, 90.

The gearbox input 85 may be of various designs, including but not limited to the elongated and substantially hollow shaft shown in the drawings. The gearbox input 85 transmits rotation of the plunger rod 25 (see above) to the planet gear carrier 115 of the planetary gear box 95. The gearbox input 85 is axially restrained by the gearbox housing 175, and is unconstrained rotationally.

As previously described, the gearbox housing 175 is an assembly comprising the ring gear 135 and the cap 125. The cap 125 may be affixed to the ring gear 135 by a variety of techniques, such as but not limited to, by a spline and snaps. Since the ring gear 135 forms a part of the gearbox housing 175 in this exemplary planetary gearbox 95 embodiment, the ring gear is restrained from rotation whenever the gearbox housing is restrained from rotation.

The ring gear 135 is the internally-toothed 180 gear of the planetary gear box 95. In this exemplary embodiment, the ring gear 135 also has gear teeth 185 formed in or otherwise affixed to a bottom face thereof. These gear teeth 185 form a gearbox housing lower face gear 190. Similarly, the cap 125 has gear teeth 195 formed in or otherwise affixed to a top face thereof. These gear teeth 195 form a gearbox housing upper face gear 200. Thus, in addition to the internal gearing (i.e., teeth 180) of the ring gear 135, the gearbox housing 175 also presents a lower face gear 190 and an upper face gear 200.

The speed multiplying barrel cam 90 includes gear teeth 90b that extend from the bottom thereof to form a speed multiplying barrel cam lower face gear 205. The speed multiplying barrel cam lower face gear 205 is designed to engage with the matching teeth of the upper face gear 200 of the gearbox housing 175 when the quickset mechanism 65 is placed in the direct drive or locked mode. The speed multiplying barrel cam is rotationally restrained by the direct drive barrel cam 80, inside of which the speed multiplying barrel cam 90 is nested in this exemplary quickset mechanism 65. The speed multiplying barrel cam 90 is also axially constrained by movement of the one or more cam follower pins 75.

As noted above, the speed multiplying barrel cam 90 nests inside the direct drive barrel cam 80 in the exemplary quickset mechanism 65 shown and described herein. However, in other exemplary quickset mechanism embodiments, the relationship of the direct drive barrel cam 80 and speed multiplying barrel cam 90 may be reversed or both barrel cams could be sequentially arranged in the axial direction.

The direct drive lock plate 105 of the quickset mechanism 65 includes an axial opening 210 that allows the gearbox output shaft 100 to pass therethrough. The opening 210 and the gearbox output shaft 100 may have a corresponding, non-circular shape, or the direct drive lock plate 105 may be keyed or otherwise affixed to the gearbox output shaft, such that the direct drive lock plate and the gearbox output shaft are rotationally coupled (i.e., the lock plate may not rotate on the gearbox output shaft). Although rotationally unconstrained, the direct drive lock plate 105 is axially constrained by arms 80b of the direct drive barrel cam 80. Consequently, the direct drive barrel cam 80 controls the axial position of the direct drive lock plate 105.

The direct drive lock plate 105 also includes gear teeth 215 formed in or otherwise affixed to a top face thereof. These gear teeth 215 form a direct drive lock plate upper face gear 220. The direct drive lock plate upper face gear 220 is designed to engage with matching gear teeth 185 of the gearbox housing lower face gear 190.

Because the direct drive lock plate 105 is rotationally coupled to the gearbox output shaft 100, engagement of the direct drive lock plate upper face gear 220 with the lower face gear 190 of the gearbox housing 175 will fix the ring gear 135 to the gearbox output shaft when the quickset mechanism 65 (and direct drive lock plate 105) is placed in the direct drive mode. When not in the direct drive mode, the direct drive lock plate 105 is idle, and freely rotates with the gearbox output shaft 100.

In addition to being rotationally constrained by the direct drive lock plate 105 when the direct drive lock plate is engaged with the gearbox housing 175, the gearbox output shaft 100 is also axially restrained by the gearbox housing, such as by a flange or similar feature that is located distally of the sun gear 130. The gearbox output shaft 100 may be affixed to or may be an extension of the sun gear 130.

The gearbox output shaft 100 transmits direct or speed-multiplied user rotation of the plunger button 30 to the volume screw 50. The volume screw 50 is in threaded engagement with a correspondingly-threaded retention element that is located within and fixed to the pipette body 10, such that rotation of the volume screw will result in an axial displacement of the volume screw relative to the pipette body. Since the lower face of the volume screw 50 serves as the upper stop for the plunger assembly in this exemplary quickset pipette 5, axial displacement of the volume screw 50 adjusts the volume of the pipette by altering the overall plunger stroke.

The frame 110 houses a number of quickset mechanism components, restrains the rotation of the direct drive barrel cam 80, serves as a rotational bushing for the planetary gearbox 95, rotationally constrains the one or more cam follower pins 75, and axially restrains the one or more cam follower pins. The frame 110 is fixed both axially and rotationally to the pipette body 10.

Mode selection using the transmission input 70 of the quickset mechanism 65 operates to change the restraints of the planetary gearbox 95 between a locked state and an unlocked state. In the speed multiplying mode, the planetary gearbox is in an unlocked (operational) state because the ring gear 135 (which also functions as part of the housing of the planetary gearbox) is fixed to the frame 110 and the gearbox output shaft 100 is unconstrained, thereby permitting rotation of the internal planetary gearbox components. Since the input to the planetary gearbox 95 in this exemplary embodiment is the planet gear carrier 115, the output is the sun gear 130, and the ring gear 135 is fixed to the frame 110, the planetary gear box 95 functions as a speed multiplier when unlocked. More specifically, the carrier 115 and the planet gears 120 (which are rotationally mounted on the carrier) will rotate within the fixed ring gear 135. Rotation of the planet gears 120 in this manner causes a rotation of the sun gear 130, but at a multiplied speed—in this exemplary embodiment, at a rotational speed that is four times greater than the rotational speed of the gearbox input 85 and the planet gear carrier 115. The rotational speed of the planet gear carrier 115 (input) resulting from user rotation of the plunger button 30 and the plunger rod 25 is, therefore, multiplied by the planetary gearbox 95, and subsequently transmitted to the volume screw 50 by the sun gear 130 and the gearbox output shaft 100. Thus, the volume screw 50 will rotate faster than the speed at which the user rotates the plunger button 30.

In contrast, when any two of the planetary gearbox input, ring gear 135 and output are fixed to each other, the planetary gearbox 95 is locked (non-operational)—meaning there can be no relative motion between any of the components in the planetary gearbox (neglecting backlash). In this exemplary embodiment, a locked state of the planetary gearbox 95 results both from the ring gear 135 being fixed to the frame 110 and the gearbox output shaft 100 being fixed to the ring gear.

In the direct drive mode, the gearbox output shaft 100 is fixed to the ring gear 135, and the ring gear is uncoupled from the frame 110. Consequently, the entire planetary gearbox 95 will rotate with the plunger button 30 and plunger rod 25 in the direct drive mode.

Figure 5A:
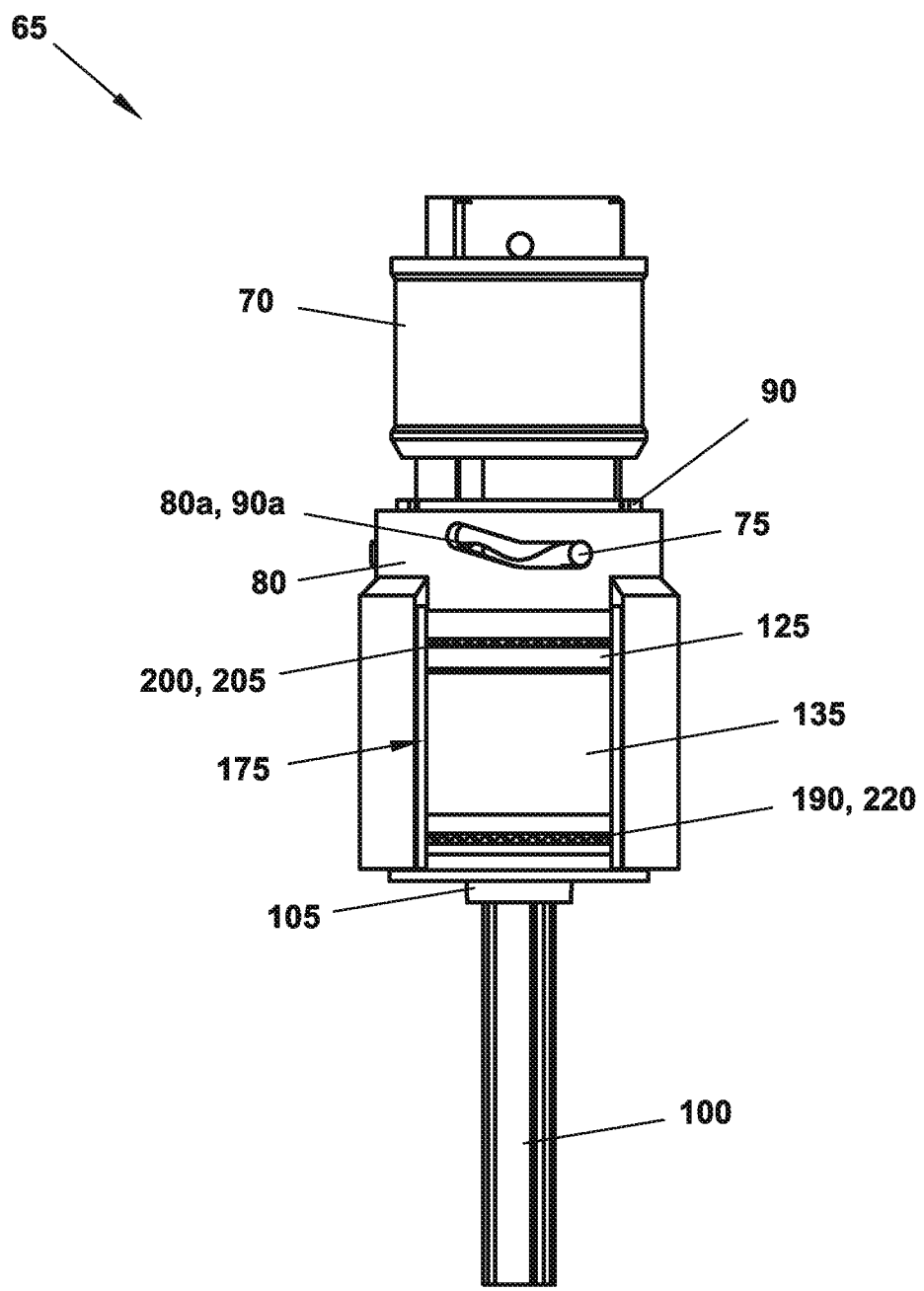
FIGS. 5A-5C schematically depict an enlarged exemplary quickset volume adjustment mechanism placed in each of three different operating modes.
Figure 5B:
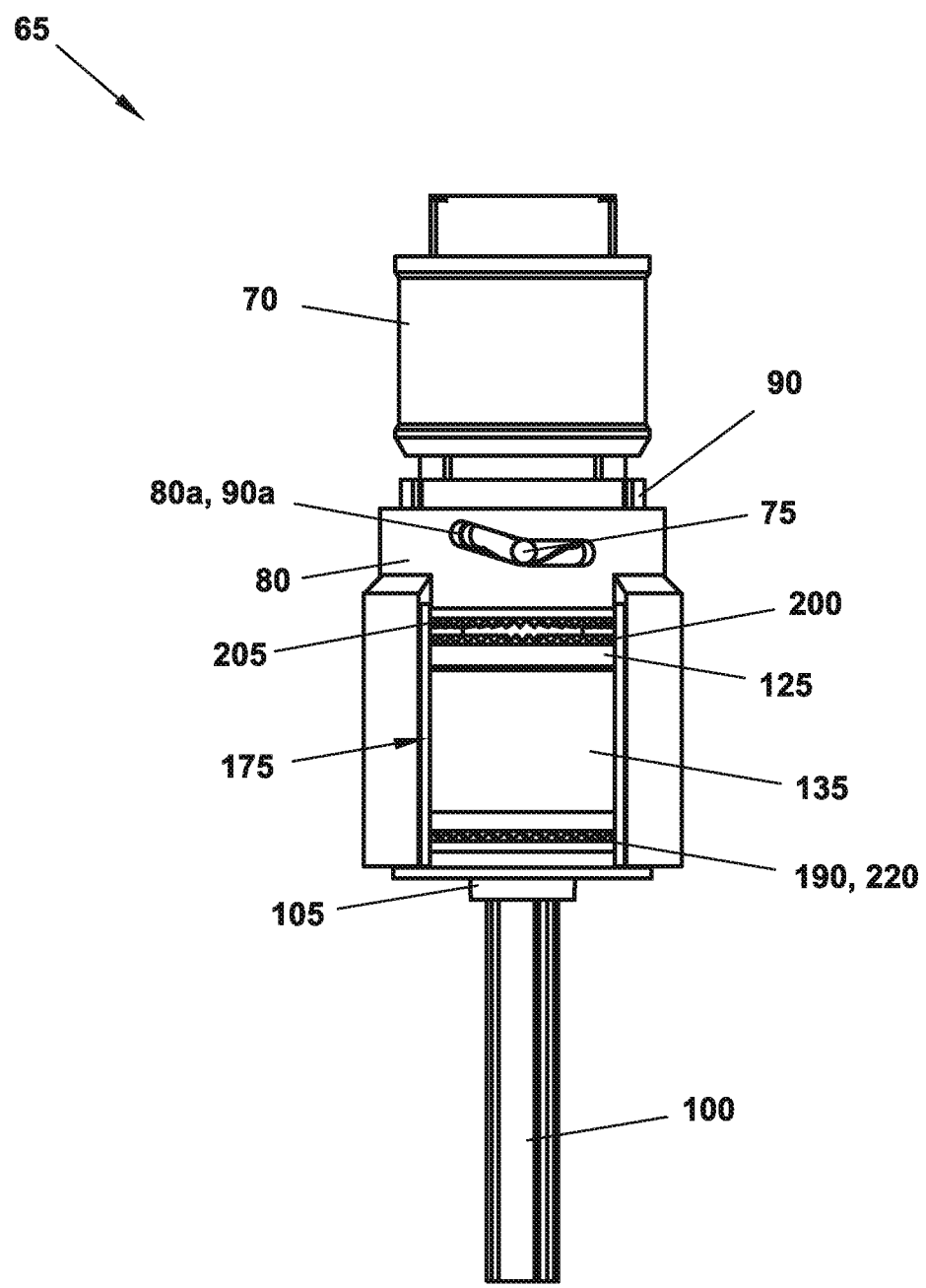
Figure 5C:
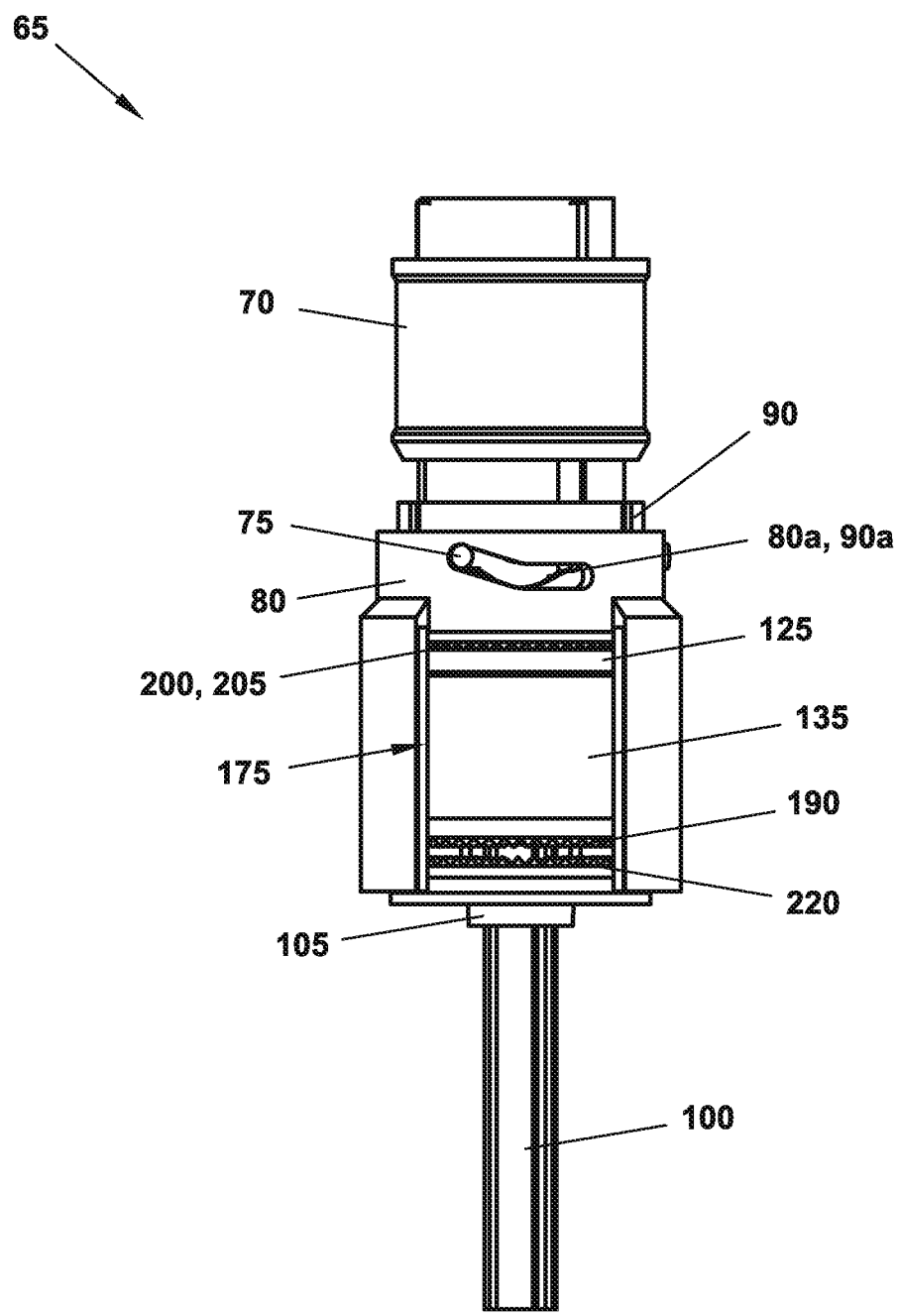

Movement and interaction of the various components of the exemplary quickset mechanism 95 when placed in each mode of operation may be better understood by reference to FIGS. 5A-5C, where the frame 110 has been omitted for clarity. In FIGS. 5A-5C, FIG. 5A represents the exemplary quickset mechanism 65 in a locked mode that prevents pipette volume adjustments, FIG. 5B represents the quickset mechanism in a direct drive (1:1 speed ratio) mode, and FIG. 5C represents the quickset mechanism in a speed multiplying (e.g., 4:1 speed ratio) mode.

The exemplary quickset mechanism 65 is represented in a locked mode in FIG. 5A. When the transmission input 70 is placed in the locked mode, movement of the one or more cam follower pins 75 in the one or more cam follower slots 80a of the direct drive barrel cam 80 causes the direct drive barrel cam to be moved upward, which simultaneously causes the direct drive lock plate 105 to also move upward and for the direct drive lock plate upper face gear 220 to engage the gearbox housing lower face gear 190. Because the direct drive lock plate 105 and the gearbox output shaft 100 are rotationally coupled, engagement of the direct drive lock plate upper face gear 220 and the gearbox housing lower face gear 190 causes the gearbox output shaft 100 to be fixed to the gearbox housing 175, which prevents rotation of the internal planetary gearbox components.

While movement of the one or more cam follower pins 75 when the transmission input 70 is placed in the locked mode causes the direct drive barrel cam to be moved upward, the same pin movement simultaneously causes the speed multiplying barrel cam 90, which is nested inside of the direct drive barrel cam 80, to be moved downward. This downward movement of the speed multiplying barrel cam 90 results in an engagement of the speed multiplying barrel cam lower face gear 205 with the gearbox housing upper face gear 200, thus effectively fixing the planetary gearbox 95 to the frame 110. The simultaneous engagement of the lock plate upper face gear 220 with the gearbox housing lower face gear 190 and the speed multiplying barrel cam lower face gear 205 with the gearbox housing upper face gear 200, prevents any rotation of the plunger button 30, the plunger rod 25 and the volume screw 50, thereby locking the quickset pipette 5.

Referring now to FIG. 5B, the quickset mechanism 65 has been placed in the direct drive mode by accordingly rotating the transmission input 70 to the proper position using the lever 165. When the transmission input 70 is rotated to the direct drive mode, resulting movement of the one or more cam follower pins 75 in the one or more cam follower slots 80a of the direct drive barrel cam 80 causes the direct drive barrel cam to be moved upward, which simultaneously causes the direct drive lock plate 105 to also move upward and for the lock plate upper face gear 220 to engage the gearbox housing lower face gear 190. Because the direct drive lock plate 105 and the gearbox output shaft 100 are rotationally coupled, engagement of the direct drive lock plate upper face gear 220 and the gearbox housing lower face gear 190 causes the gearbox output shaft 100 to be fixed to the gearbox housing 175, thereby preventing rotation of the internal planetary gearbox components.

The aforementioned rotation of the transmission input 70 and resulting movement of the one or more cam follower pins 75 also causes the speed multiplying barrel cam 90, which is nested inside the direct drive barrel cam 80, to be moved upward. This upward movement of the speed multiplying barrel cam 90 results in a disengagement of the speed multiplying barrel cam lower face gear 205 from the gearbox housing upper face gear 200. The disengaged speed multiplying barrel cam 90 is thus idle in the direct drive mode, while the planetary gearbox 95 is essentially a rigid coupling between the plunger rod 25 and the gearbox output shaft 100 and rotates freely with the plunger rod. As a result, a rotation of the plunger button 30 and affixed plunger rod 25 will result in a like (1:1) rotation of the volume screw 50.

Referring now to FIG. 5C, the quickset mechanism 65 has been placed in the speed multiplying mode by accordingly rotating the transmission input 70 to the proper position using the lever 165. When the transmission input 70 is rotated to the speed multiplying mode, resulting movement of the one or more cam follower pins 75 in the one or more cam follower slots 80a of the direct drive barrel cam 80 causes the direct drive barrel cam to be moved downward, which simultaneously causes the direct drive lock plate 105 to also move downward and for the lock plate upper face gear 220 to disengage from the gearbox housing lower face gear 190. This causes the lock plate to idle.

The aforementioned rotation of the transmission input 70 and resulting movement of the one or more cam follower pins 75 also causes the speed multiplying barrel cam 90, which is nested inside the direct drive barrel cam 80, to be moved downward. This downward movement of the speed multiplying barrel cam 90 results in an engagement of the speed multiplying barrel cam lower face gear 205 with the gearbox housing upper face gear 200, thus effectively fixing the ring gear 135 to the frame 110 and enabling rotation of the planetary gear components. As a result, a rotation of the plunger button 30 and affixed plunger rod 25 will result in rotation of the volume screw 50 at a multiplied (e.g., 4:1) rotational speed.

A user is not required to engage the speed multiplying mode of the quickset pipette 5 when making a volume adjustment. However, in the case where a user desires to use the speed multiplying mode to hasten a volume adjustment, the user first engages the speed multiplying mode by placing the lever 165 of the quickset mechanism transmission unit 70 in the speed multiplying position. The speed multiplying position (as well as the direct drive and locked positions) may each be defined by a detent that provides tactile feedback to the user, and/or by a graphical representation on the pipette body 10. Subsequent rotation of the plunger button 30 thereafter produces a speed-multiplied rotation of the volume screw 50 and a corresponding coarse volume adjustment. When the desired quickset pipette 5 volume is neared, the user may switch the quickset mechanism 95 to the direct drive mode by placing the lever 165 of the transmission unit 70 in the direct drive position. A subsequent rotation of the plunger button 30 will then produce a 1:1 rotation of the volume screw 50 and a corresponding fine volume adjustment. Using both the speed multiplying mode and the direct drive mode allows for both rapid and precise pipette volume setting. Once the desired pipette volume has been set, the user may prevent an inadvertent adjustment or drift of the volume setting by placing the lever 165 of the transmission unit 70 in the locked position.

To further facilitate volume setting, the quickset pipette 5 is provided with an exemplary volume setting display assembly 400. The volume setting display assembly 400 of this exemplary quickset pipette 5 is comprised of a series of numbered counter wheels 225 that are coupled to the volume adjustment assembly of the pipette. More particularly, the counter wheels 225 are rotationally coupled via gearing to the volume screw 50. Rotation of the plunger button 30 and volume screw 50 thus results in a corresponding rotation of the counter wheels 225 such that the numerical readout presented by the counter wheels is representative of the current volume setting of the pipette. As described earlier, the counter wheels 225 are visible through the opening 60 in the pipette body 10. Other pipette embodiments may substitute an electronic volume setting display and corresponding volume detection sensors, etc., for the counter wheel-based volume setting display assembly 400 of the quickset pipette 5.

Figure 6:
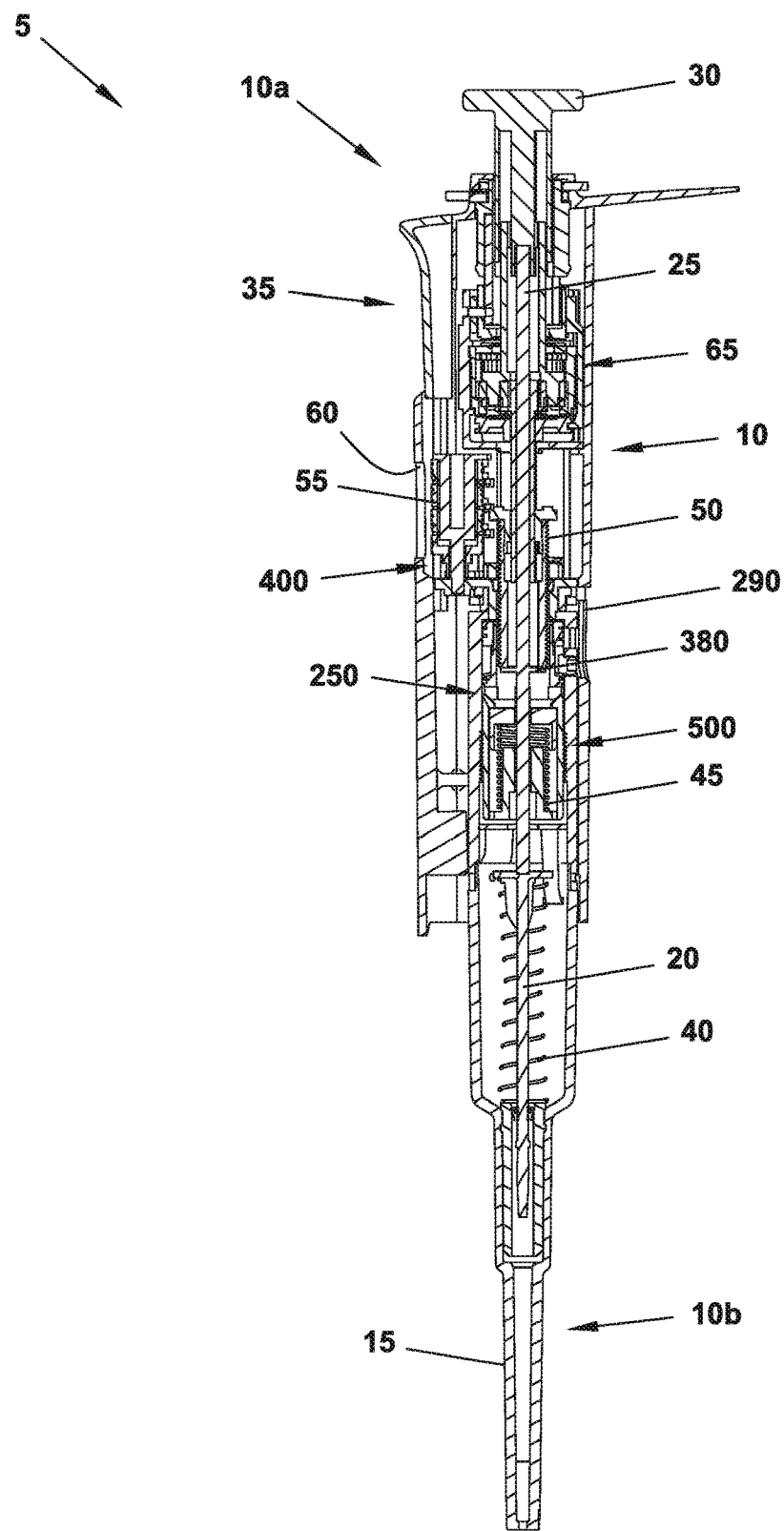
FIG. 6 is another cross-sectional view of the exemplary volume-adjustable manual pipette of FIG. 1 showing an adjusted liquid volume after manipulation of the installed quickset volume adjustment mechanism.

The quickset pipette 5 of FIG. 1 is depicted again in FIG. 6 after a volume adjustment has been made thereto. In this case, the volume of the quickset pipette 5 as shown in FIG. 6 has been reduced in comparison to the volume of the quickset pipette 5 as shown in FIG. 1. Consequently, it may be observed that the plunger button 30, plunger rod 25 and associated flange 380, piston 20, and volume screw 50 have all moved distally within the pipette body 10, and the stroke spring 35 has been compressed. The distally-displaced position of the bottom face of the volume screw 50 defines a new plunger unit upper stop position.

As described previously, calibration of the dispensed fluid volume is required for accurate pipetting. Consequently, pipettes are typically calibrated at the factory and may also be re-calibrated thereafter, such as during servicing operations.

Pipette calibration is typically performed using distilled water. As a result, pipette users may desire to input a factory volume offset when pipetting fluids with densities that differ from the density of distilled water. Likewise, it may be desirable to input a factory volume offset when pipetting at atmospheric conditions that differ from standard temperature and pressure (STP)—at high altitudes, for example.

To this end, the exemplary quickset pipette 5 also includes a calibration/offset mechanism 250. One exemplary embodiment of such a calibration/offset mechanism is shown in detail in FIGS. 7A-9.

Figure 7A:
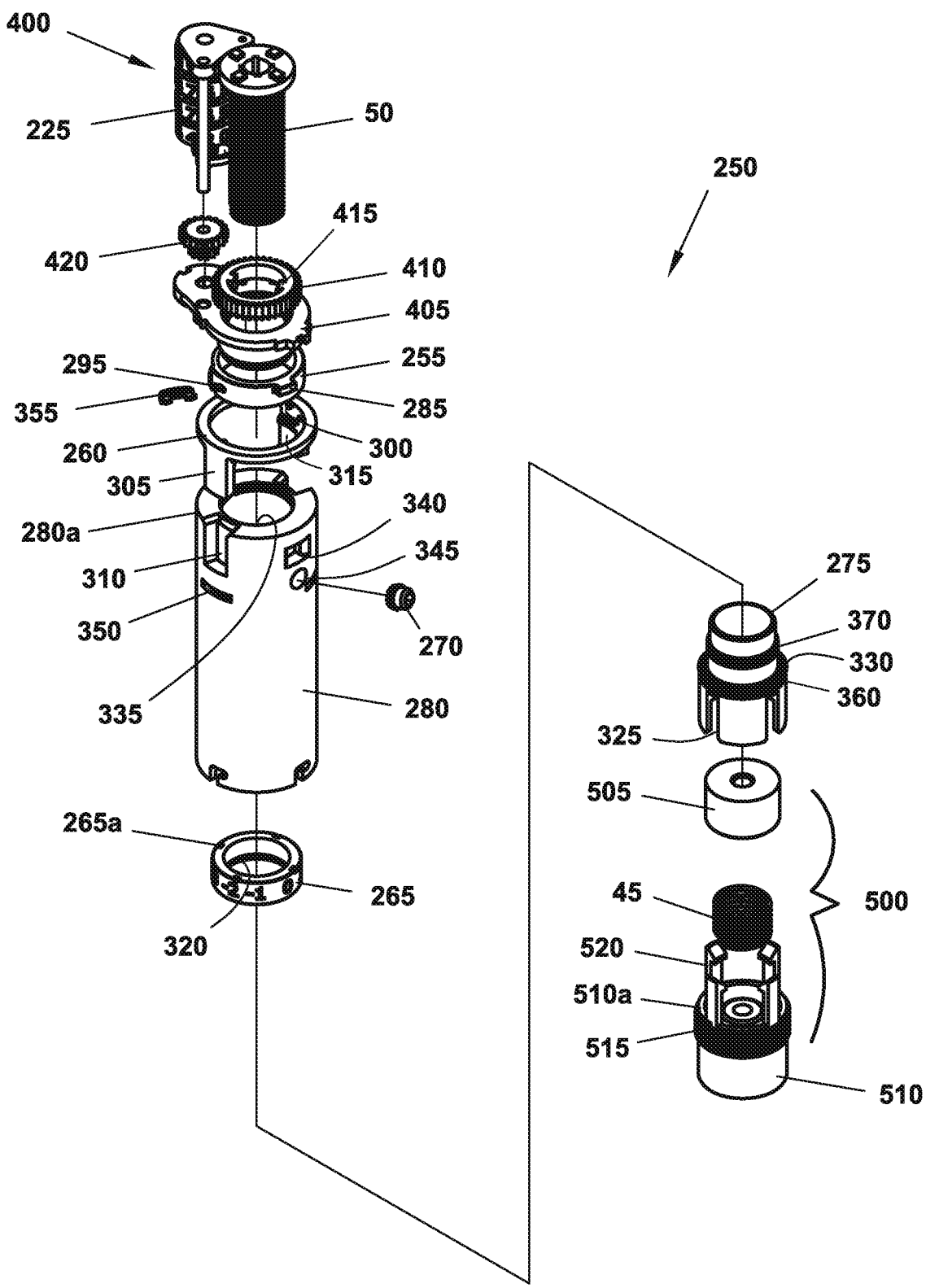
FIGS. 7A-7B are exploded perspective views of an exemplary calibration/offset mechanism.
Figure 7B:
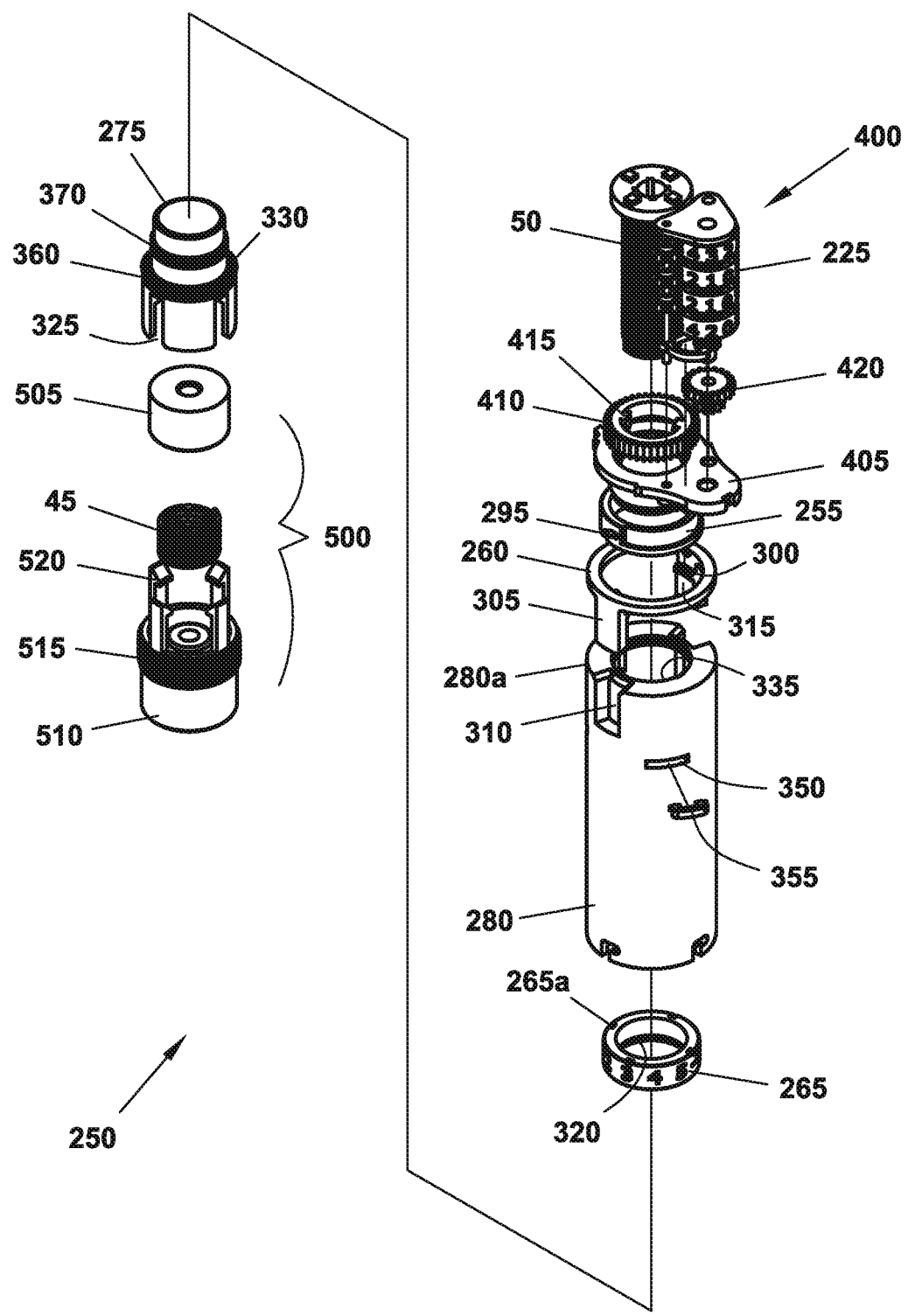

As shown in FIGS. 7A-7B, the exemplary calibration/offset mechanism 250 includes—proximally-to-distally in general order of appearance—a mode selection mechanism in the form of a mode selector barrel cam (i.e., a barrel cam input) 255; a follower element in the form of a follower barrel cam (i.e., a barrel cam follower) 260, which is coupled to the barrel cam input 255 so as to be axially displaceable in response to movement of the barrel cam input; an offset counter 265; a user rotatable input mechanism in the form of a pinion gear 270; and a coupling 275 for coupling the offset counter 265 to an axially displaceable threaded element 510 (a housing of a blowout assembly 500 in this example) that may be selectively axially displaced to adjust the home position of a pipette to which the calibration/offset mechanism 250 is installed, thereby increasing or decreasing the liquid volume of the pipette. The above-listed components of the calibration/offset mechanism 250 are substantially retained in a (calibration) housing 280 when the calibration/offset mechanism 250 is in an assembled state, as is shown in FIG. 8B.

Figure 8B:
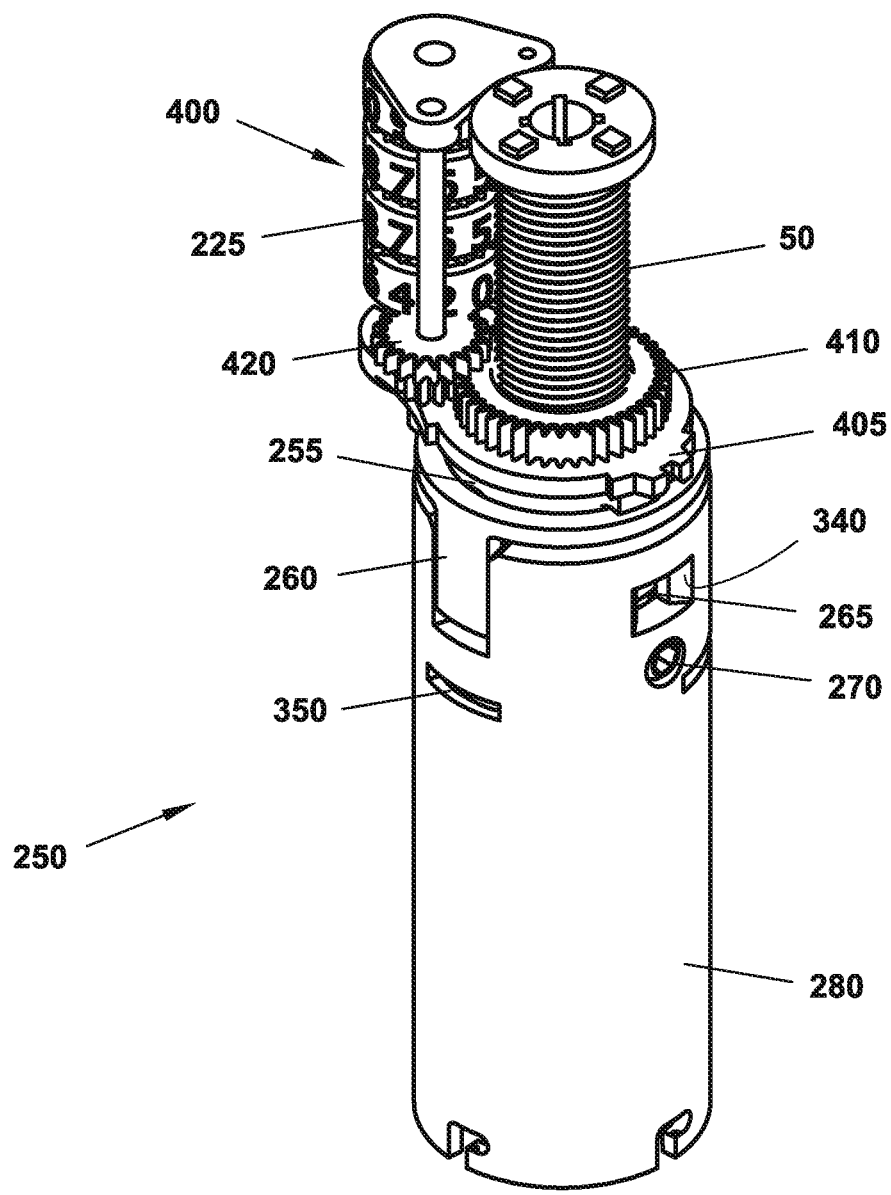

In addition to the calibration/offset mechanism 250, FIGS. 7A-7B and FIG. 8B also show various components of the volume setting display assembly 400. This exemplary volume setting display assembly 400 is shown to include the aforementioned volume screw 50, and the counter wheels 225 that present a numerical representation of the set pipette volume. The volume setting display assembly 400 further includes a mounting plate 405 having an opening through which the volume screw 50 passes, and which is adapted to receive and support the assembly of counter wheels 225 and associated gearing. The mounting plate 405 may be a component of the volume setting display assembly 400 or may be a component of the calibration/offset mechanism 250, but is nonetheless affixed to the calibration housing 280 (such as by a press fit) and serves as an upper axial constraint for the barrel cam input 255 of the calibration/offset mechanism.

The volume screw 50 also passes through a transfer gear 410 that rotates on the top face of the mounting plate 405. The transfer gear 410 includes tabs 415 that engage corresponding slots on the volume screw 50, such that rotation of the volume screw produces a rotation of the transfer gear. A cluster gear 420 is interposed between the transfer gear 410 and the counter wheel gearing, such that rotation of the volume screw 50 will cause a volume-indicating rotation of the counter wheels 225.

The barrel cam input 255 of the calibration/offset mechanism 250 is partially nested in but extends upward some distance from the barrel cam follower 260. The barrel cam input 255 includes a mode selector element such as a selection lever 285 or similar actuator that is accessible through a calibration/offset aperture 290 in the pipette body 10. The mode selection lever is usable to select either a calibration mode or an offset mode of the calibration/offset mechanism 250 by rotating the barrel cam input 255, as explained in more detail below.

As mentioned above, the follower element (barrel cam follower) 260 of the exemplary calibration/offset mechanism 250 is axially displaceable in response to movement of the mode selection mechanism (barrel cam input 255). To that end, one or more arcuate or sloped cam slots 295 are present on the exterior of the barrel cam input 255 in this particular example, and are located and designed to engage with one or more cam follower pins 300 that extend inward from an interior surface of the barrel cam follower 260. As a result, rotation of the barrel cam input 255 via the selection lever 285 will produce an axial displacement of the barrel cam follower. The design of the mode selection mechanism and follower element may be different in other embodiments, such that the follower element may be axially displaced by an action of the mode selection mechanism that is other than rotation.

The barrel cam input 255 of this exemplary embodiment is rotationally constrained (within some angle). The barrel cam input 255 is also axially constrained by the calibration housing 280 and the mounting plate 405.

The barrel cam follower 260 is interposed between the barrel cam input 255 and the calibration housing 280, and includes downwardly extending arms 305 designed to engage with slot features 310 in the calibration housing 280. An offset counter rotation groove 315 may be present on interior surfaces of the barrel cam follower arms 305. The one or more cam follower pins 300 can be seen to extend inwardly from the barrel cam follower 260, as described above.

The offset counter 265 displays the magnitude and direction of any volume offset input by a user, such as through a series of positive and negative numerals printed along the circumference thereof. When the calibration/offset mechanism 250 is assembled, the offset counter 265 is retained in and freely rotates within the calibration housing 280, such as within the offset counter rotation groove 315 of the barrel cam follower 260. In this manner, the offset counter 265 is axially constrained by (i.e., moves axially with) the barrel cam follower 260, but is not rotationally constrained by the barrel cam follower.

The offset counter 265 fits over an upper section of the coupling 275, and is selectively rotationally coupled to or rotationally decoupled therefrom as explained further below. The offset counter 265 may have slots 265a, recesses or other similar features in a top surface thereof that are selectively engageable with corresponding male features of another offset counter component. For example, the underside of a top surface of the calibration housing 280 may include such features. The male features will block upward movement of the offset counter 265 when the offset counter slots 265a are not aligned with the male features, but will permit upward movement when there is an alignment via entry of the male features into the slots. Alignment of the male features and the slots 265a in the offset counter 265 is configured to occur only if the offset counter is set to a "zero" position—thereby preventing decoupling of the offset counter and performance of a calibration operation if the current pipette calibration setting is in an offset condition.

To rotationally couple the offset counter 265 to the coupling 275, the offset counter may include inner gear teeth or splines 320 that are designed to engage with mating gear teeth or splines 370 on the exterior of the coupling. In other embodiments, the offset counter 265 and the coupling 275 may have corresponding tapers or may be provided with some other features to ensure that the offset counter and the coupling will rotate together when the calibration/offset mechanism 250 is set to the offset mode.

The coupling 275 rotationally couples the offset counter 265 to the blowout assembly 500 when the calibration/offset mechanism 250 is set to the offset mode (which is the normal calibration/offset mechanism mode), and transfers rotational motion of the pinion gear 270 to a blowout assembly housing 510 of the blowout assembly 500. The offset counter may be decoupled from the blowout assembly to permit factory calibration (in the calibration mode). Positional adjustments to the blowout assembly 500 will thus be transmitted to and indicated by the offset counter during user offset input, but not during factory calibration (or recalibration). The coupling 275 includes vertical slots 325 in a lower section thereof for receiving alignment and engagement arms 520 of the blowout assembly housing 510.

The rotationally unconstrained pinion gear 270 is provided to convert user input into rotation of the coupling 275. More specifically, the pinion gear 270 converts rotation around an axis that is perpendicular to the offset counter 265 and coupling 275 into rotation around the central axis of the offset counter and coupling. This allows a user to conveniently rotate the coupling 275 by engaging the pinion gear 270 using a hex key or other suitable tool. Rotation of the coupling 275 by the pinion gear 270 is produced by engagement of the pinion gear with a corresponding miter gear 330 located on the coupling.

The calibration housing 280 of this exemplary calibration/offset mechanism 250 is a substantially hollow cylinder. The calibration housing 280 includes an axial opening 335 in a proximal end 280a thereof to permit passage of the plunger rod 25; the aforementioned slots 310 at the proximal end for receiving the downwardly extending arms 305 of the barrel cam follower 260; a calibration viewport 340 for observing the numerals printed on the offset counter 265; and a pinion gear access opening 345 for allowing engagement and rotation of the pinion gear 270 through the calibration housing. The calibration housing 280 may also include one or more slots 350 or similar apertures through which corresponding clips 355 or equivalent retention elements may be inserted for retention of one or more calibration/offset mechanism 250 components. For example, the clips 355 may be inserted into the slots 350 in the calibration housing 280 to engage a retention grove 360 in the coupling 275, thereby causing the coupling to be axially restrained within the calibration housing.

Figure 9:
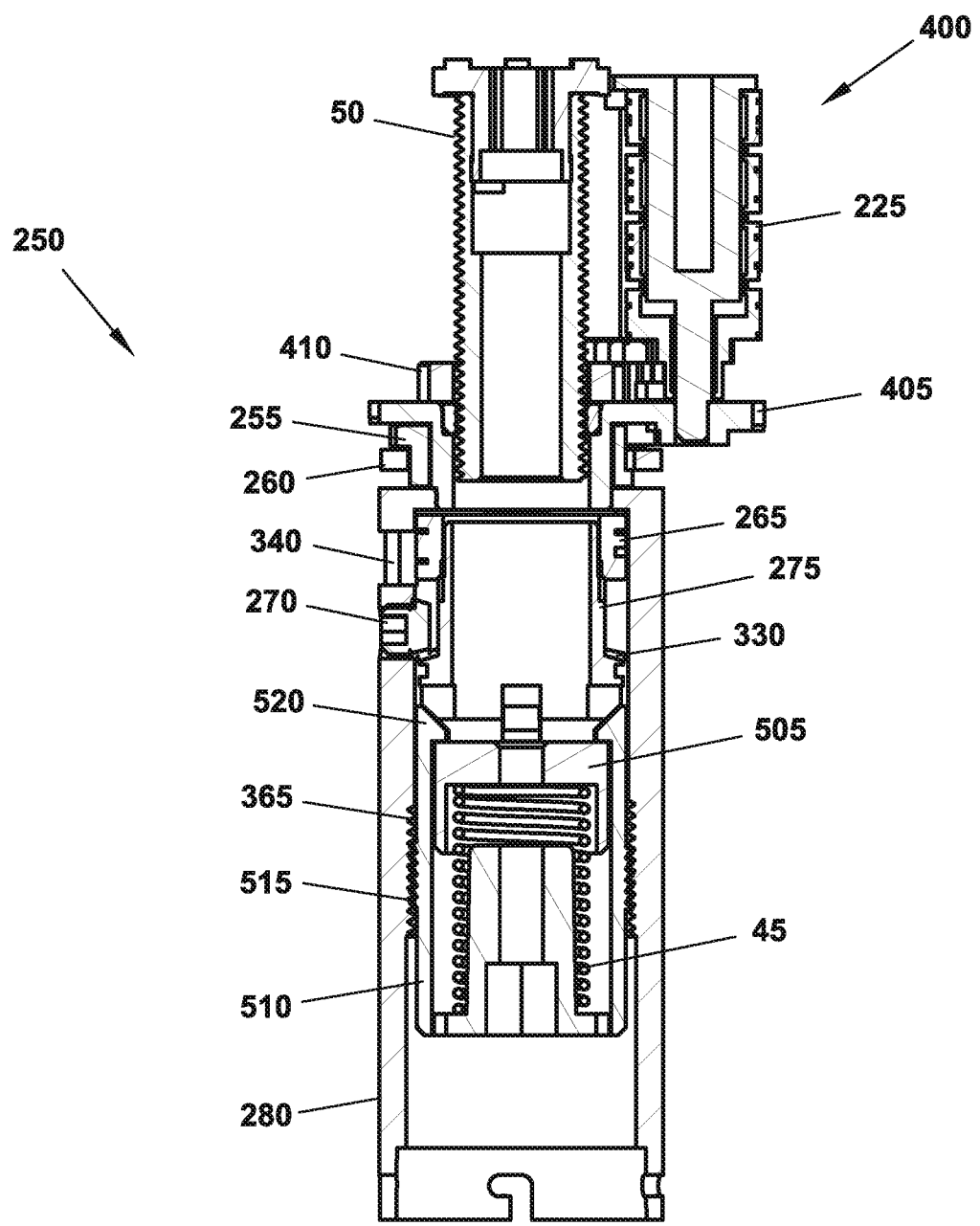
FIG. 9 is an enlarged cross-sectional view of the exemplary calibration/offset mechanism of FIG. 7B.
Figure 10A:
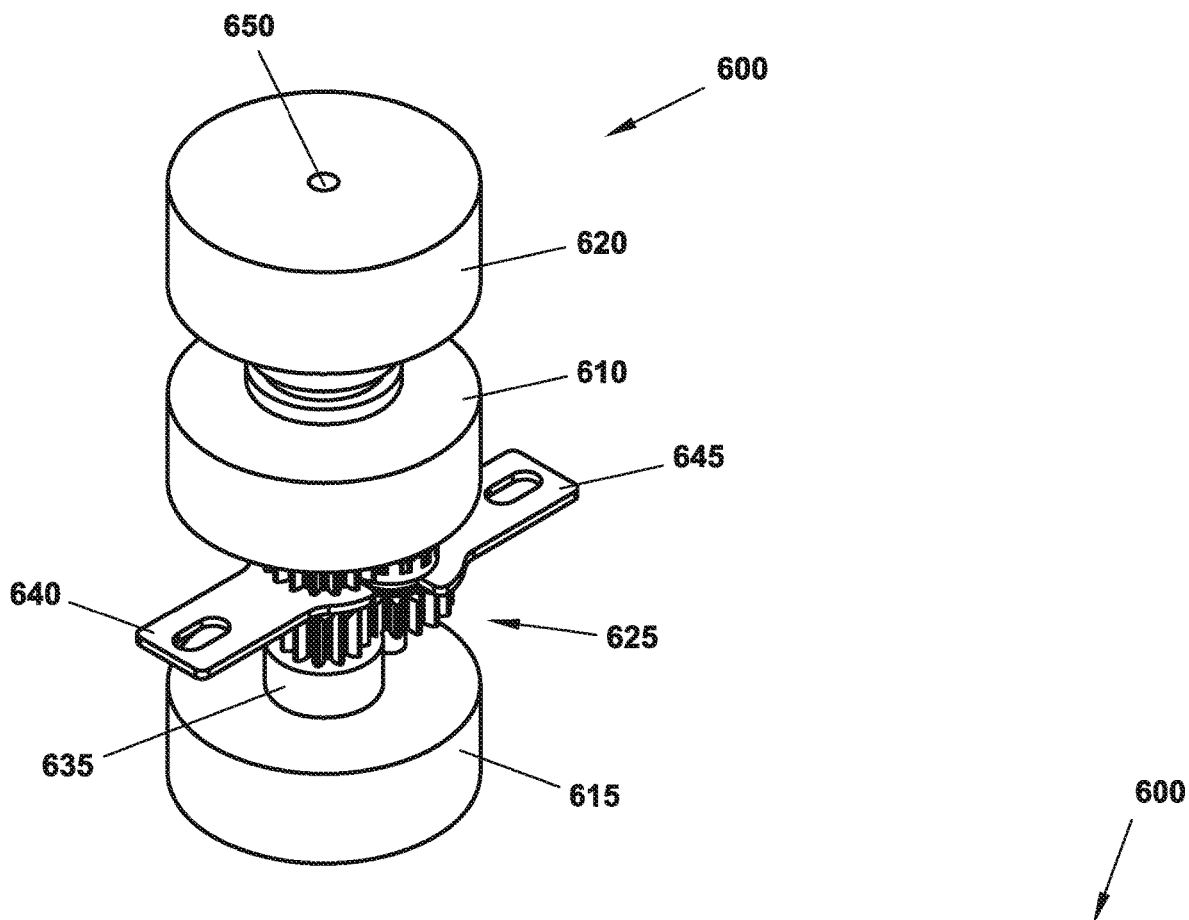
FIG. 10A is an enlarged perspective view and FIG. 10B is an enlarged top view, of an alternative exemplary quickset volume adjustment mechanism.
Figure 10B:
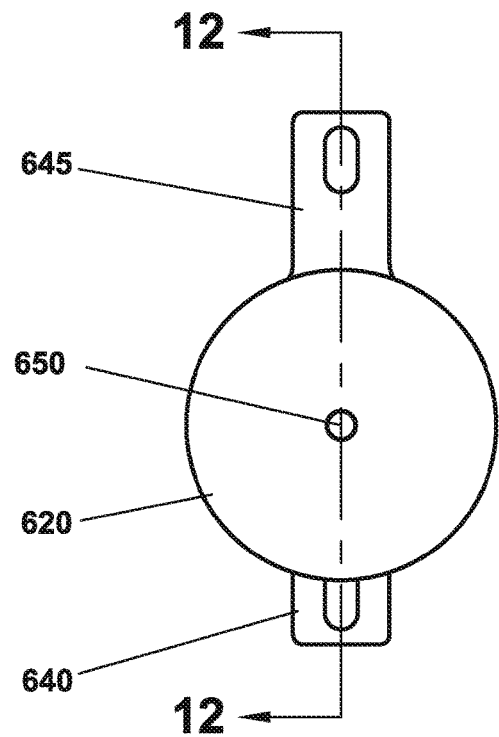

The calibration housing 280 further includes internal threads 365 (see FIG. 9). The internal threads 365 are provided to mate with external threads 515 at a proximal end of the threaded element (blowout assembly housing 510) of the blowout assembly 500, such that the blowout assembly housing and the calibration housing may be assembled in threaded engagement. The calibration housing 280 also serves as the positional reference point for calibration, and is fixed for all degrees of freedom to the pipette body 10.

The blowout assembly 500 includes a blowout piston 505, which is located in the blowout assembly housing 510 along with the blowout spring 45. The blowout spring 45 is located below the blowout piston 505 such that the blowout piston is biased toward the proximal end of the quickset pipette 5 and the upper stop position thereof.

External threads 515 are present at the proximal end 510*a* of the blowout assembly housing 510. The external threads 515 on the blowout assembly housing 510 are provided to engage with the corresponding internal threads 365 in the calibration housing 280, as described above. Thus, when the calibration/offset mechanism 250 is assembled, the blowout assembly housing 510 may be axially displaced relative to the calibration housing 280 by threading the blowout assembly housing into or out of the calibration housing.

The blowout assembly housing 510 further includes upwardly extending alignment arms 520 that are dimensioned and located to fit into the slots 325 in the lower portion of the coupling 275 in an interdigitating manner. This interdigitating assembly rotationally couples the blowout assembly housing 510 to the coupling 275 such that the blowout assembly housing will be caused to correspondingly rotate when the coupling is rotated by the pinion gear 275, while also allowing axial movement of the blowout assembly housing relative to the coupling.

The home position of the quickset pipette 5 may be defined as the position where the pipette piston 20 has fully compressed the stroke spring 40 and the aspirated liquid volume has been fully dispensed, but where a blowout stroke and any compression of the blowout spring 45 has not yet commenced. In this exemplary embodiment, the plunger rod 25 also includes a flange 380 that will contact a top surface of the blowout piston 505 of the blowout assembly 500 when the plunger rod is in the home position (and will also contact the bottom face of the volume screw 50 when the plunger rod is in the upper stop position). Calibrating the pipette volume or inputting a volume offset may be accomplished by moving the axial position of the blowout assembly 500 (including the blowout spring 45), which has the effect of increasing or decreasing the liquid volume of the pipette.

When the calibration/offset mechanism 250 is fully assembled, the barrel cam input 255 is both rotationally and axially constrained; the barrel cam follower 260 is rotationally restrained by the calibration housing 280 and axially constrained by movement of the one or more cam follower pins 285; the coupling 275 is axially restrained in the calibration housing, but is free to rotate; the offset counter 265 is axially restrained relative to the barrel cam follower 260 but movable therewith, and is rotationally coupled to the coupling 275 when the calibration/offset mechanism 250 is set to the offset mode and rotationally decoupled from the coupling when the calibration/offset mechanism is set to the calibration mode; the pinion gear 270 is axially restrained by the calibration housing 280 but is rotationally unconstrained; and the blowout assembly 500 is rotationally constrained by the coupling but free to move axially relative thereto, and also axially constrained (but not restrained) by engagement of the external threads 515 on the blowout assembly housing 510 and the corresponding internal threads 365 in the calibration housing 280.

The mode selection lever 285 of the barrel cam input 255 is used to select either the calibration mode or the offset mode of the calibration/offset mechanism 250. Typically, the default calibration/offset mechanism 250 will be the offset mode, such that any user adjustment of the pinion gear 270 will be indicated by offset counter 265.

To input a volume offset, a user first ensures that the calibration/offset mechanism 250 is already set to the offset mode, or manipulates the mode selection lever 285 of the barrel cam input 255 to select the offset mode. When the mode selection lever 285 of the barrel cam input 255 is placed in the offset mode, the barrel cam follower 260 is moved downward by movement of the one or more cam follower pins 285 of the rotating barrel cam follower in the one or more cam slots 295 on the exterior of the barrel cam input 255. This downward movement of the barrel cam follower 260 causes a like downward movement of the offset counter 265, which is axially restrained relative to the barrel cam follower 260 by offset counter rotation groove 315 in the barrel cam follower arms 305. The offset counter 265 is thereby rotationally coupled to the coupling 275.

A volume offset of the quickset pipette 5 is then accomplished by extending a hex key or other appropriate tool through the calibration/offset aperture 290 in the pipette body 10 and through the pinion gear access opening 345 in the calibration housing 280, to engage and rotate the pinion gear 270 in one direction or the other so as to input a desired negative or positive volume offset. Rotation of the pinion gear 270 produces a rotation of the coupling 275, which correspondingly causes rotation of the blowout assembly housing 510 that is rotationally coupled thereto. Rotation of the blowout assembly housing 510 results in an upward (threading) or downward (unthreading) axial displacement of the blowout assembly 500 relative to the calibration housing 280 and the pipette body 10—moving the home position of the pipette and causing a change in the volume of liquid that can be aspirated by the pipette.

Because the offset counter 265 is rotationally coupled to the coupling 275, the offset counter will rotate along with the coupling when the user rotates the pinion gear 270 in the offset mode. Consequently, the amount of inputted offset is indicated by the offset counter 265 and is observable by the user through the calibration viewport 340 in the calibration housing, which is viewable through the calibration/offset aperture 290 in the pipette body 10.

To perform a factory calibration or a recalibration, a user manipulates the mode selection lever 285 of the barrel cam input 255 to select the calibration mode. When the mode selection lever 285 of the barrel cam input 255 is placed in the calibration mode, the barrel cam follower 260 is moved upward by movement of the one or more cam follower pins 285 of the rotating barrel cam follower in the one or more cam slots 295 on the exterior of the barrel cam input 255. This upward movement of the barrel cam follower 260 causes a like upward movement of the offset counter 265, which is axially restrained relative to the barrel cam follower 260 by offset counter rotation groove 315 in the barrel cam follower arms 305. The offset counter 265 is thereby rotationally decoupled from the coupling 275. As mentioned previously, the calibration/offset mechanism may include a feature that prevents the calibration mode from being selected (and the offset counter 265 from being decoupled from the coupling 275) unless the offset counter 265 is set to the "zero" position. This ensures that a calibration operation is not inadvertently performed with a volume offset already input to the pipette 5.

A calibration or recalibration of the quickset pipette 5 is then effectuated by extending a hex key or other appropriate tool through the calibration/offset aperture 290 in the pipette body 10 and through the pinion gear access opening 345 in the calibration housing 280, to engage and rotate the pinion gear 270 in one direction or the other. Rotation of the pinion gear 270 again produces a rotation of the coupling 275, which causes a corresponding rotation of the blowout assembly housing 510 and an upward (threading) or downward (unthreading) axial displacement of the blowout assembly 500 relative to the calibration housing 280 and the pipette body 10—moving the home position and causing a desired change in the liquid volume of the pipette.

Because the offset counter 265 is rotationally decoupled from the coupling 275 in the calibration mode, the offset counter may not be observable through the calibration viewport 340 and will not rotate with the coupling when the user rotates the pinion gear 270. Consequently, the offset counter 265 will not reflect any change in the pipette volume that occurs during a calibration or recalibration operation.

An alternative exemplary embodiment of a pipette quickset volume adjustment mechanism 600 is represented in FIGS. 10A-12. As with the previously described exemplary quickset volume adjustment mechanism, this quickset volume adjustment mechanism 600 is designed to be installed in the body 605 of a pipette. To that end, the quickset volume adjustment mechanism 600 includes a pair of upper and lower mounting elements 610, 615 that may be shaped and dimensioned to correspond to the interior walls of the given pipette body 605 to which the quickset mechanism will be installed. In other embodiments, a greater or lesser number of such mounting elements may be employed, and said mounting element(s) may have different shapes and or dimensions from those shown in FIGS. 10A-12.

The pipette into which the exemplary quickset volume adjustment mechanism 600 is installed may be similar to an exemplary pipette described above. That is, the pipette may include, for example, a body portion 605 for gripping by a user, a distal tip mounting portion that is adapted to receive and retain a pipette tip, a plunger assembly having a piston that is reciprocatable within the body portion, a plunger rod that extends proximally upward from the piston, and a plunger button that is located outside the body portion and is affixed to a proximal end of the plunger rod for manipulation by user. A stroke spring may again reside within the body portion to drive the piston proximally during a liquid aspiration phase of a pipetting operation, and a blowout spring may reside within the body portion to return the piston from a blowout operation that may be performed subsequent to dispensing aspirated liquid from the pipette. The pipette may also include other features such as but not limited to, a tip ejector a volume adjustment assembly, a volume setting display assembly, and a calibration/offset mechanism. Consequently, the pipette may operate in a typical fashion (as explained above) to aspirate and dispense a volume of a liquid of interest.

Because volume changes between consecutive aspiration/dispensing operations may be significant, as previously described, the exemplary quickset volume adjustment mechanism 600 may be used to selectively multiply the speed by which the aspiratable pipette volume may be adjusted. Broadly speaking, the quickset volume adjustment mechanism 600 is shown in FIGS. 10A-12 to include a rotatable user input element 620 that is usable to adjust the pipette volume, a gear train 625 (described in more detail below) that includes a number of selectively interacting individual gears, an input shaft 630 that transmits rotation of the user input element 620 to the gear train, an output shaft 635 that transmits rotation of the gear train 625 to a volume screw (not shown) of the pipette to which the volume adjustment mechanism is installed, and a pair of linkage elements 640, 645 that that are operative to manipulate the gear train 625 so as to permit selection between at least a (direct) 1:1 and a speed multiplying volume setting mode. The interaction of these components to provide either a direct or a speed multiplying mode is described in detail below.

Figure 12:
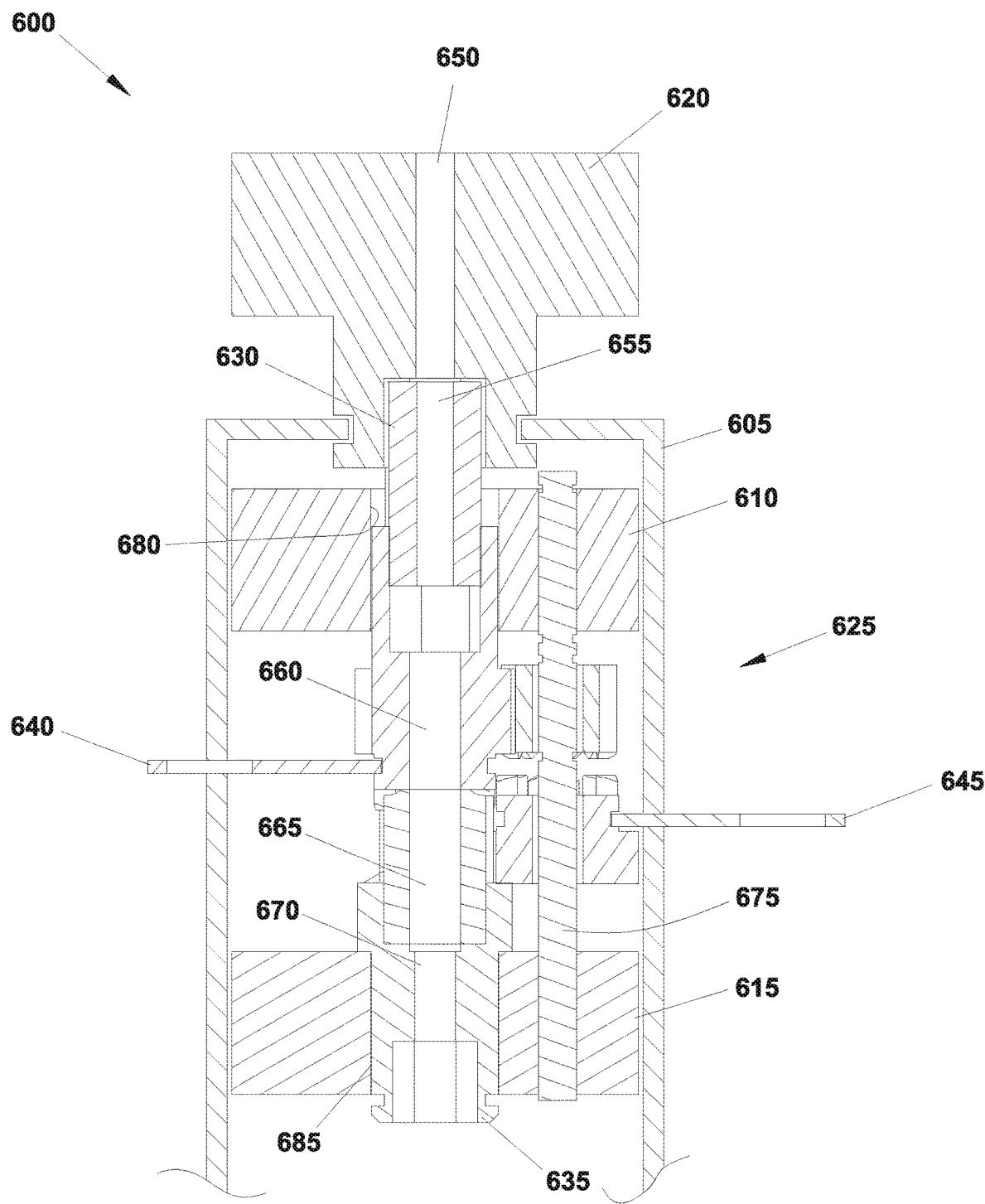
FIG. 12 is a cross-sectional view of the exemplary quickset volume adjustment mechanism taken along line A-A of FIG. 10B.

As should be apparent to one of skill in the art, a plunger button or similar pipette actuator would reside proximally of the user input element 620 when the quickset volume adjustment mechanism 600 is installed to the pipette body. To this end, the quickset volume adjustment mechanism 600 includes an axial bore 650 in the user input element 620 through which may pass the plunger rod to which the plunger button is attached. Referring to FIG. 12, it may also be observed that similar and cooperating axial bores 655, 660, 665, 670 also pass respectively through the input shaft 630, an input gear 700 of the gear train 625, an output gear 715 of the gear train, and the output shaft 635. As such, the plunger rod acts as an alignment element for various components of the quickset volume adjustment mechanism 600, while depression of the plunger rod via the plunger button is still operable to linearly displace the piston of the pipette plunger assembly in typical fashion.

The gear train 625 of this exemplary quickset volume adjustment mechanism 600 includes four gears, the selection and engagement of which determines whether the quickset volume adjustment mechanism operates in a 1:1 or a speed multiplying mode. In at least some embodiments, the gear train 625 may also be alternatively set to a free spinning and/or locked state by which the quickset volume adjustment mechanism 600 is resultantly placed in a non-functional or locked mode.

Figure 11A:
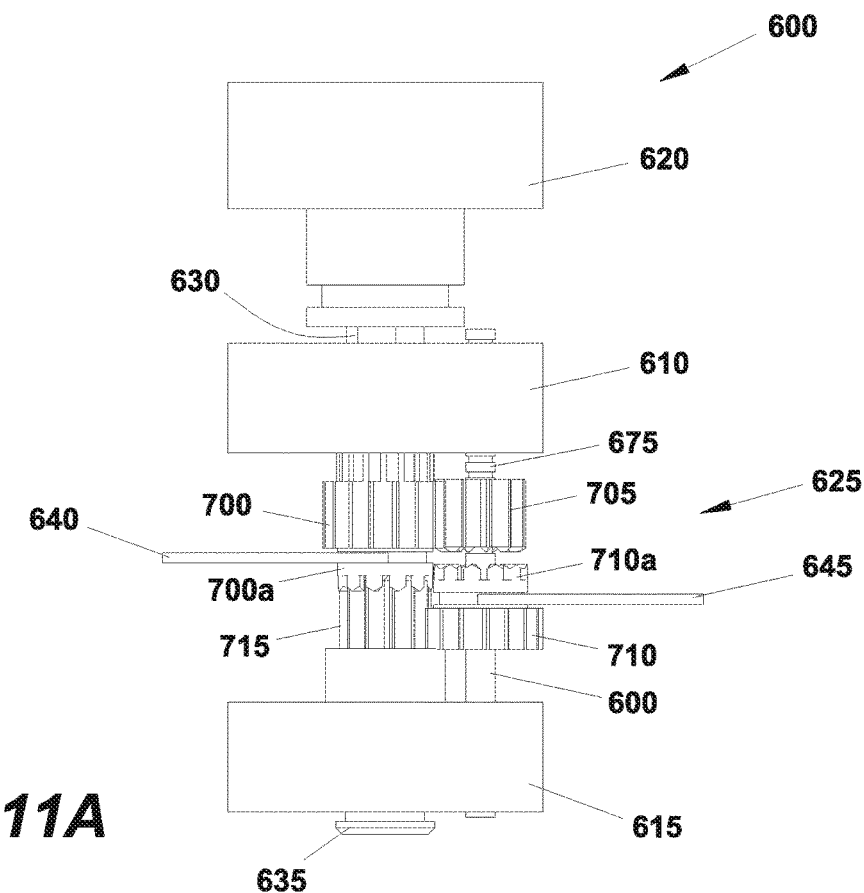
FIG. 11A is an enlarged side view and FIG. 11B is an enlarged front view, of the exemplary quickset volume adjustment mechanism of FIGS. 10A-10B.
Figure 11B:
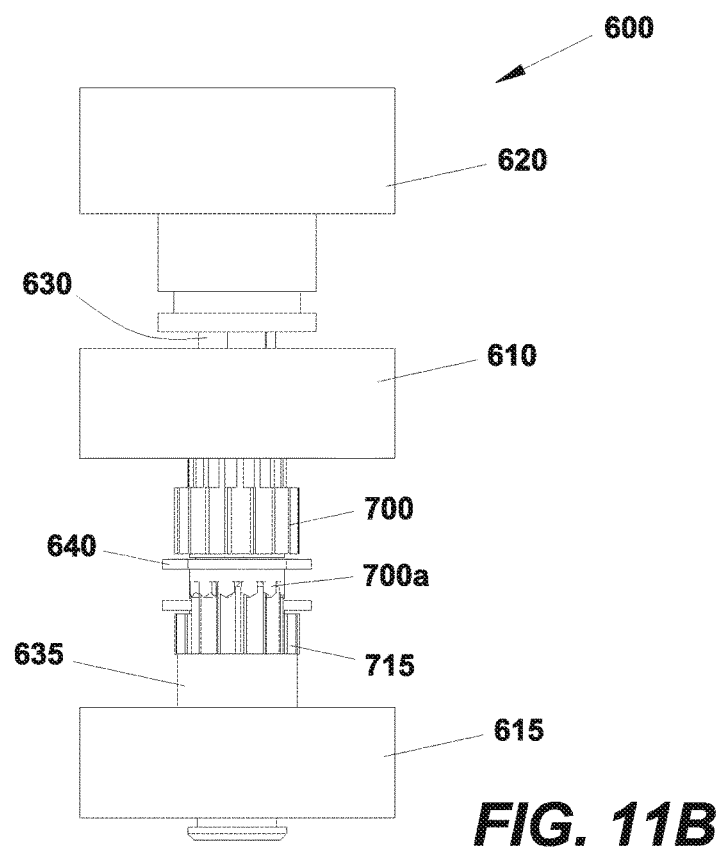

Referring primarily to FIG. 11A and FIG. 12, it may be observed that the gear train includes the input gear 700, a transfer gear 705, a speed-multiplying gear 710, and the output gear 715. The transfer gear 705 meshes with the input gear 700, and the speed-multiplying gear 710 meshes with the output gear 715. The transfer gear 705 and speed-multiplying gear 710 of this exemplary embodiment rotate on a separate shaft 675 that extends between the mounting elements 610, 615.

The speed-multiplying gear 710 includes an integral splined coupling element 710a at the proximal end thereof. Similarly, the input gear 700, includes an integral splined coupling element 700a at the distal end thereof. The splined coupling element 710a allows the associated speed-multiplying gear 710 to be selectively engaged with the transfer gear 705 when it is desired to perform a volume adjustment at a multiplied speed. The splined coupling element 700b allows the associated input gear 700 to be selectively engaged with the output gear 715 when it is desired to perform a volume adjustment at a 1:1 speed.

As shown in FIG. 12, a portion of each of the input shaft 630 and the input gear 700 passes through a bore 680 in the upper mounting element 610. The proximal end of the input gear 700 is rotationally coupled to the distal end of the input shaft 630, such as through the use of corresponding hexagonal or other non-circular shapes, or by another means that would be familiar to one of skill in the art. Although rotationally coupled thereto, the input gear 700 is axially displaceable by some distance along the input shaft 630. The input gear 700 may thus be moved upward and downward relative to the pipette body 5 so as to be selectively engaged with or disengaged from the output gear 715. Assuming the gear train is not placed in an optional locked state (as described below), rotation of the user input element 620 causes a like rotation of the input gear 700.

In a manner similar to that of the input gear 700, the speed-multiplying gear 710 is axially displaceable by some distance along the shaft 675. The speed-multiplying gear 710 may thus be moved upward and downward relative to the pipette body 5 so as to be selectively engaged with or disengaged from the transfer gear 705.

As can be further observed in FIG. 12, a portion of the output shaft 635 passes through a bore 685 in the lower mounting element 615. The output shaft 635 is rotationally coupled at its proximal end to the distal end of the output gear 715, such that rotation of the output gear 715 will cause a rotation of the output shaft 635. A distal end of the output gear 635 is shown to be adapted for connection to a volume screw of the pipette which, as explained above, alters the aspiratable liquid volume of the pipette when rotated.

As mentioned above, this exemplary quickset volume adjustment mechanism 600 includes a pair of linkage elements 640, 645 that are operable to set the state of the gear train 625. In at least some other embodiments, a single linkage element that is coupled to appropriate gears of the gear train 625 may be substituted for the separate linkage elements 640, 645 shown and described herein.

In any case, it should be understood by one of skill in the art that a single linkage element or the pair of linkage elements 640, 645 would be connected to a mode selection component or components (not shown) located exterior of an associated pipette so as to be accessible and operable by a user. In some exemplary embodiments, the mode selection component may be designed to produce a like (coupled) upward or downward movement of a single linkage element or of the pair of linkage elements 640, 645, so as to provide selection between only a direct or speed multiplying volume setting mode by accordingly setting the appropriate state of the gear train 625. In other exemplary embodiments, where such as here there are separate linkage elements 640,645, a mode selection component(s) may be designed to permit selective and independent movement of the linkage elements in both an upward and downward direction. Such a design permits the setting of additional locked and free-spinning gear train 625 states and allows the quickset volume adjustment mechanism 600 to be placed in a locked mode or a non-functional mode in addition to a direct and a speed multiplying volume setting mode. Mode selection along with associated linkage element movement and gear train states is discussed in more detail below.

In the drawing figures, both of the linkage elements 640, 645 are depicted in the down position for purposes of illustration, which manipulates the gear train 625 such that the quickset volume adjustment mechanism 600 is set to the direct drive (1:1) mode. More specifically, placement of the first linkage element 640 in the down position causes the spline connector 700a of the input gear 700 to engage with the output gear 715, while placement of the second linkage element 645 in the down position causes the spline connector 710a of the speed-multiplying gear 710 to disengage from the transfer gear 705. Consequently, in the direct drive mode, rotation of the user input element 620 will cause a rotation of both the transfer gear 705 and the output gear 715. However, because the transfer gear 705 is disengaged from the speed multiplying gear 710, the transfer gear will rotate idly while rotation of the output gear 715 is caused directly by the input gear 700 in a 1:1 ratio with rotation of the user input element 620.

Oppositely, placement of both linkage elements 640, 645 in the up position manipulates the gear train 625 such that the quickset volume adjustment mechanism 600 is set to the speed multiplying mode. More specifically, placement of the first linkage element 640 in the up position causes the spline connector 700a of the input gear 700 to disengage from the output gear 715, while placement of the second linkage element 645 in the up position causes the spline connector 710a of the speed-multiplying gear 710 to engage with the transfer gear 705. Disengagement of the input gear 700 from the output gear 715 prevents any direct rotation of the output gear by the input gear (and the user input element 620). Consequently, in the speed multiplying mode, rotation of the user input element 620 will cause a rotation of the input gear 700, rotation of the input gear will cause a rotation of the transfer gear 705 and the speed-multiplying gear 710 engaged therewith, and rotation of the speed-multiplying gear will cause a rotation of the output gear 715. In this exemplary embodiment, the pitch diameters of the various gears 700, 705, 710, 715 are selected such that the output gear 715 and output shaft 635 will rotate at twice the speed of the user input element 620 when the quickset volume adjustment mechanism 600 is set to the speed multiplying mode—i.e., the speed ratio of the gear train 625 in the speed-multiplied mode is 2:1. Other speed ratios are possible in other embodiments.

Placement of the first linkage element 640 in the up position and the second linkage element 645 in the down position, places the gear train 625 in a free spinning state and sets the quickset volume adjustment mechanism 600 to a non-functional mode. More specifically, placement of the first linkage element 640 in the up position causes the spline connector 700a of the input gear 700 to disengage from the output gear 715, while placement of the second linkage element 645 in the down position causes the spline connector 710a of the speed-multiplying gear 710 to disengage from the transfer gear 705. Consequently, in the free spinning state of the gear train 625, rotation of the user input element 620 will cause the input gear 700 and the transfer gear 705 to rotate idly. The speed-multiplying gear 710 and the output gear 715 will not rotate due to their disengaged conditions and, therefore, no rotation of the output shaft 635 nor any volume setting change of the pipette will occur upon rotation of the user input element 620.

Lastly, placement of the first linkage element 640 in the down position and the second linkage element 645 in the up position, locks the gear train 625 and sets the quickset volume adjustment mechanism 600 to a locked mode. More specifically, placement of the first linkage element 640 in the down position causes the spline connector 700a of the input gear 700 to engage with the output gear 715, while placement of the second linkage element 645 in the up position causes the spline connector 710a of the speed-multiplying gear 710 to engage with the transfer gear 705. Consequently, with all of the gears 700, 705, 710, 715 of the gear train 625 engaged, any rotation of the user input element 620, the gear train, or the output shaft 635, is prohibited. In the locked mode, the quickset volume adjustment mechanism 600 is thus locked against a change in the aspiratable liquid volume of the pipette through rotation of the user input element 620.

Other gear train configurations are possible in other similar exemplary quickset volume adjustment mechanism embodiments. For example, the total number of gears in the gear train may be different than the four gears shown in FIGS. 10A-12. The gear ratios of the gears used may also be different to thereby produce a multiplied speed ratio of more or less than 2:1. Other gear train modifications are also possible.

The aforementioned mode selection component or components on or associated with the outside of the pipette body for operating the linkage elements 640, 645 may take many forms. For example, a mode selection component(s) may be provided in a form such as but not limited to, a pivotable collar, separate sliding or pivoting collars, one or more tabs or buttons, or any other element or elements that may be connected to a linkage element or to multiple linkage elements 640, 645 to facilitate the upward and downward movement thereof.

As used herein, the term "distal" is intended to refer to the end of the pipette where the pipette tip normally resides, and the term "proximal" is intended to refer to the end of the pipette where the plunger button normally resides.

As used herein, the terms "axial" or "axially" are intended to refer to a direction that is parallel to the length-wise axis of the plunger rod when installed to the pipette.

As used herein, the term "central axis" is intended to refer to the symmetrical axis of a component or the pipette.

As used herein, the term "downward" is intended to refer to a proximal-to-distal direction relative to the pipette, and the term "upward" is intended to refer to a distal-to-proximal direction relative to the pipette.

As used herein "first" and "second" are intended only to differentiate between two elements or components for purposes of description, and not to indicate an order, a preference, or superiority or inferiority, of any kind.

While certain exemplary embodiments of a pipette calibration and volume offset mechanism are described in detail above, the scope of the inventive concept is not considered limited by such disclosure, and modifications are possible as evidenced by the following claims:

1. A pipette calibration and volume offset mechanism, comprising:
   a housing;
   a mode selection mechanism having a mode selector element movable between a first and second position, the mode selection mechanism being axially and rotationally constrained at a proximal end of the housing;
   an axially displaceable follower element interposed between the mode selection mechanism and the housing and coupled to the mode selection mechanism;
   an offset counter located within the housing and axially movable with the follower element;
   a threaded element located within the housing and having an axial position that is adjustable to define a home position of a pipette when the calibration and volume offset mechanism is installed in the pipette;
   a coupling located within the housing, the coupling rotationally coupled to the threaded element and operative to selectively rotationally couple the offset counter to or decouple the offset counter from the threaded element; and
   a user rotatable input mechanism that is rotationally coupled to the coupling;
   wherein, the offset counter will not rotate with the input mechanism and the coupling when the mode selector element of the mode selection mechanism is in the first position; and
   wherein, the offset counter will rotate with the input mechanism and the coupling when the mode selector element of the mode selection mechanism is in the second position.

2. The pipette calibration and volume offset mechanism of claim 1, wherein:
   a mounting plate is coupled to the proximal end of the housing; and
   the mode selection mechanism is interposed between the mounting plate and the housing.

3. The pipette calibration and volume offset mechanism of claim 1, wherein the mode selection mechanism and the follower element are both barrel cams.

4. The pipette calibration and volume offset mechanism of claim 3, wherein the mode selection barrel cam is at least partially nested within the follower barrel cam.

5. The pipette calibration and volume offset mechanism of claim 4, wherein the coupling of the follower element to the mode selection mechanism comprises:
   at least one arcuate or sloped cam slot on an outside surface of the mode selection barrel cam; and
   at least one cam follower pin extending inward from the follower barrel cam and engaging the at least one cam slot in the mode selection barrel cam;
   such that rotation of the mode selector barrel cam will produce an axial displacement of the follower barrel cam.

6. The pipette calibration and volume offset mechanism of claim 1, wherein the offset counter is rotationally coupled to the coupling by a mechanism selected from the group consisting of the engagement of gear teeth or splines, and the engagement of corresponding tapers.

7. The pipette calibration and volume offset mechanism of claim 1, wherein the user rotatable input mechanism is a pinion gear.

8. The pipette calibration and volume offset mechanism of claim 7, wherein the coupling is provided with a miter gear that engages with the pinion gear to translate user rotation of the pinion gear into rotation of the coupling.

9. The pipette calibration and volume offset mechanism of claim 1, further comprising a viewport in the housing for observing numerals or other indicators located on the offset counter.

10. The pipette calibration and volume offset mechanism of claim 1, further comprising a user input mechanism access opening in the housing for allowing engagement and rotation of the user input mechanism.

11. The pipette calibration and volume offset mechanism of claim 1, wherein upward axial movement of the offset counter is prohibited if the offset counter is in an offset position.

12. The pipette calibration and volume offset mechanism of claim 1, wherein:
   the threaded element and the housing are in threaded engagement; and
   rotation of the input mechanism will result in rotation of the threaded element and axial displacement of the threaded element relative to the housing.

13. The pipette calibration and volume offset mechanism of claim 12, wherein:

the threaded element forms a housing of a blowout assembly;

the blowout assembly further includes a blowout piston located in the blowout assembly housing; and a blowout spring is located in the blowout assembly housing, distally of the blowout piston, such that the blowout piston is biased toward a proximal end of the housing.

\* \* \* \* \*